(12) United States Patent
Hori

(10) Patent No.: US 12,357,117 B2
(45) Date of Patent: Jul. 15, 2025

(54) ELECTRIC KETTLE AND POWER SUPPLY UNIT

(71) Applicant: MAKITA CORPORATION, Anjo (JP)

(72) Inventor: Atsushi Hori, Anjo (JP)

(73) Assignee: MAKITA CORPORATION, Anjo (JP)

( * ) Notice: Subject to any disclaimer, the term of this patent is extended or adjusted under 35 U.S.C. 154(b) by 954 days.

(21) Appl. No.: 17/493,605

(22) Filed: Oct. 4, 2021

(65) Prior Publication Data

US 2022/0117435 A1    Apr. 21, 2022

(30) Foreign Application Priority Data

Oct. 16, 2020    (JP) ................................. 2020-174758

(51) Int. Cl.
*A47J 27/21*    (2006.01)
*A47J 31/44*    (2006.01)
(Continued)

(52) U.S. Cl.
CPC ..... *A47J 27/21166* (2013.01); *A47J 27/2105* (2013.01); *A47J 31/4421* (2013.01);
(Continued)

(58) Field of Classification Search
CPC ................. A47J 31/005; A47J 27/2105; A47J 27/21083; A47J 27/21166; A47J 27/212;
(Continued)

(56) References Cited

U.S. PATENT DOCUMENTS

| 2006/0207986 A1* | 9/2006 | Brown | A47J 27/004 |
| | | | 219/442 |
| 2009/0084270 A1* | 4/2009 | Pinheiro | A47J 31/005 |
| | | | 99/280 |

(Continued)

FOREIGN PATENT DOCUMENTS

| CN | 112006536 A | * 12/2020 |
| JP | S55-119018 U | 8/1980 |

(Continued)

OTHER PUBLICATIONS

English translation of CN-112006536-A (Year: 2020).*
Jan. 23, 2024 Office Action issued in Japanese Patent Application No. 2020-174758.

*Primary Examiner* — Chris Q Liu
(74) *Attorney, Agent, or Firm* — Oliff PLC

(57) ABSTRACT

An electric kettle has a kettle body and a power supply unit that is configured to supply power to the kettle body. The power supply unit has a plate part, a power supply base and a mounting unit. The plate part has a first surface and a second surface. The power supply base is arranged on a side of the first surface of the plate part and configured such that the kettle body is placed on top thereof. The power supply base has a power supply connection part that is electrically removably connected to the power receiving connection part. The mounting unit is arranged on a side of the second surface of the plate part and configured such that a battery pack is removably coupled thereto as the external power (Continued)

source for supplying power to the heating part via the power supply connection part and the power receiving connection part.

15 Claims, 28 Drawing Sheets

(51) Int. Cl.
*H01M 50/209* (2021.01)
*H01M 50/244* (2021.01)
*H01M 50/247* (2021.01)
*H01M 50/264* (2021.01)
*H01M 10/46* (2006.01)

(52) U.S. Cl.
CPC ....... *H01M 50/209* (2021.01); *H01M 50/244* (2021.01); *H01M 50/247* (2021.01); *H01M 50/264* (2021.01); *H01M 10/46* (2013.01)

(58) Field of Classification Search
CPC .... A47J 27/004; A47J 27/21; A47J 27/21008; A47J 27/21158; A47J 27/21175; A47J 27/62; A47J 31/505; A47J 27/0817; A47J 27/088; A47J 27/10; A47J 27/21191; A47J 27/21091; A47J 27/21041; A47J 27/21141; A47J 27/21025; A47J 31/053; A47J 31/057; A47J 31/18; A47J 31/20; A47J 31/4403; A47J 31/54; A47J 31/4439
USPC .......................... 99/279, 280, 281, 330, 403
See application file for complete search history.

(56) References Cited

U.S. PATENT DOCUMENTS

| | | | |
|---|---|---|---|
| 2011/0240624 A1* | 10/2011 | Zhang | A47J 27/2105 219/209 |
| 2012/0091117 A1* | 4/2012 | Cheng | A47J 27/2105 219/385 |
| 2013/0187461 A1 | 7/2013 | Goto et al. | |
| 2016/0374500 A1* | 12/2016 | Bugatti | A47J 27/21141 219/435 |
| 2017/0098949 A1* | 4/2017 | Goto | A47J 31/005 |
| 2019/0021538 A1* | 1/2019 | Kondo | A23F 5/262 |

FOREIGN PATENT DOCUMENTS

| | | |
|---|---|---|
| JP | 2012-080990 A | 4/2012 |
| JP | 5657332 B2 | 1/2015 |
| WO | 2018/074355 A1 | 4/2018 |

* cited by examiner

[FIG.1]
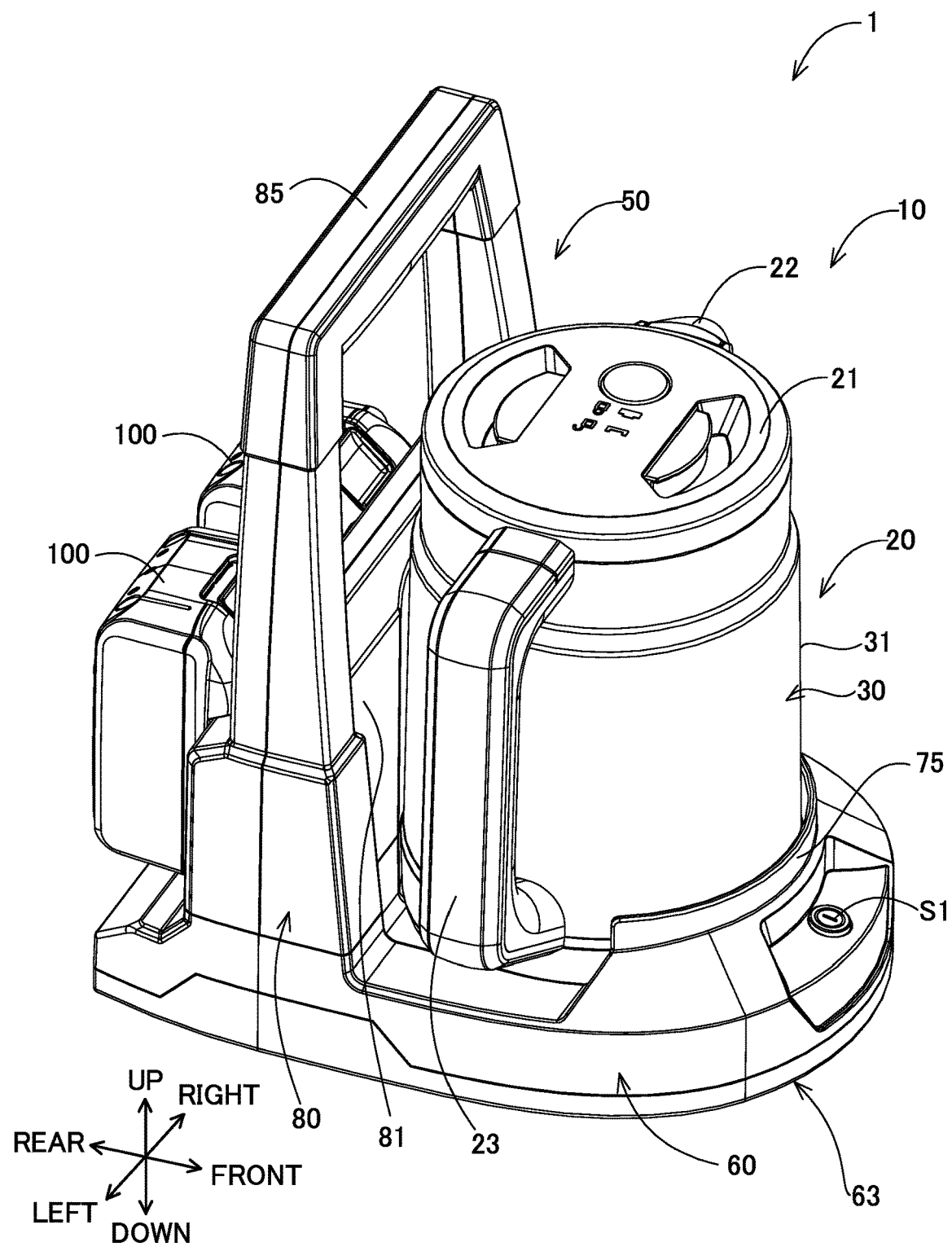

[FIG.2]
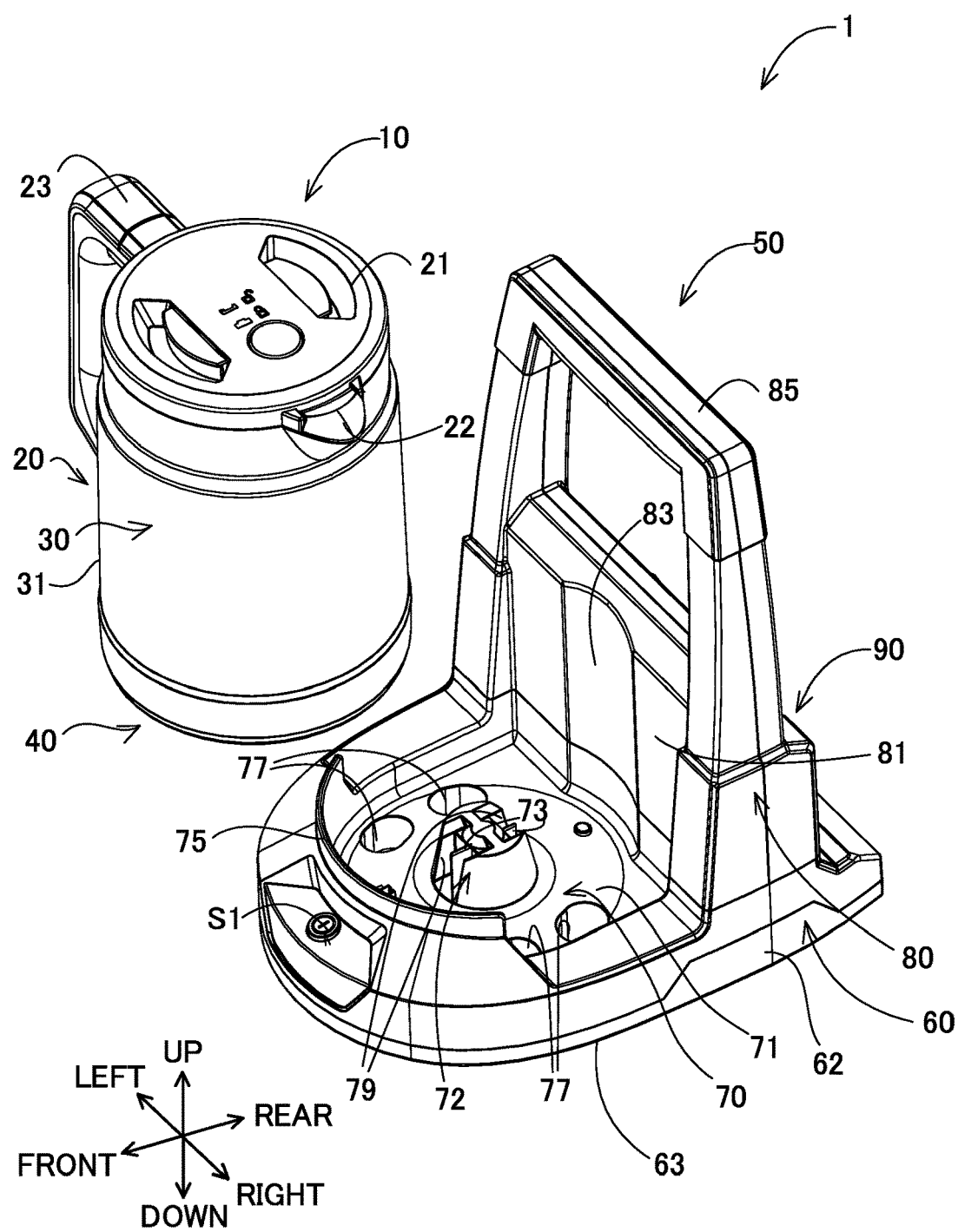

【FIG.3】
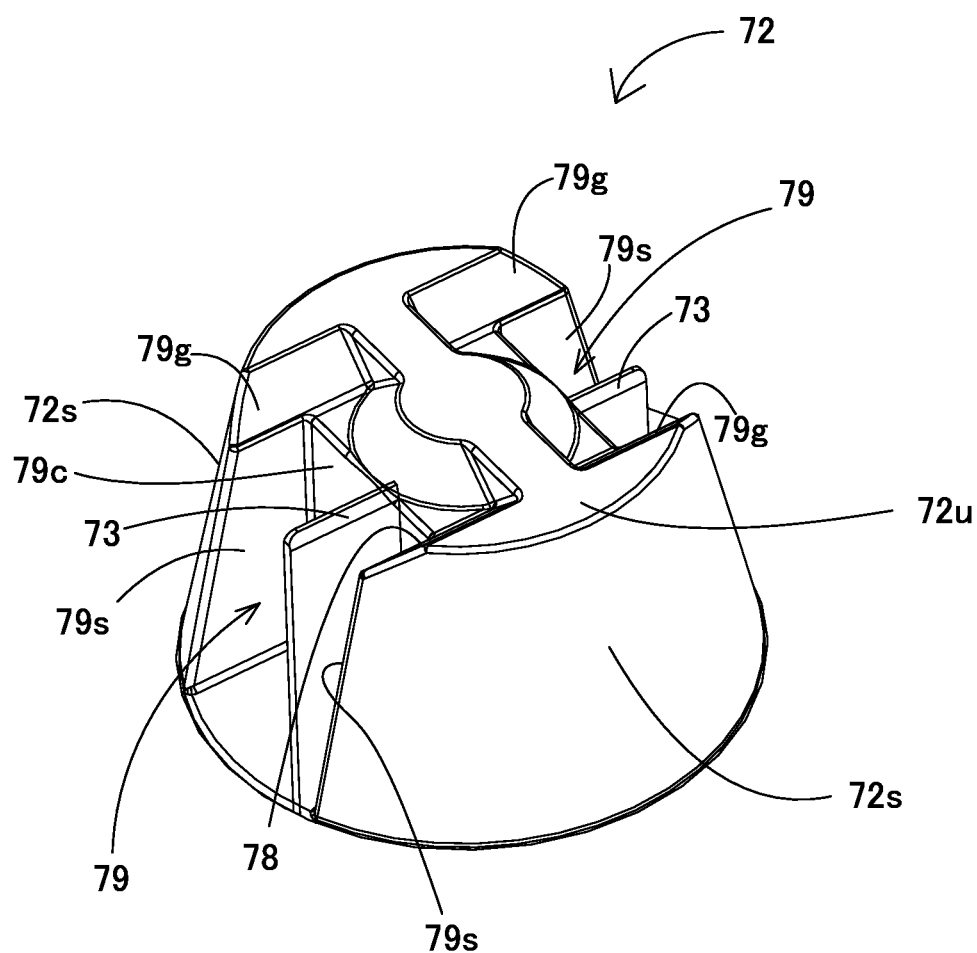
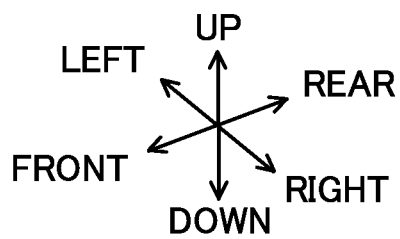

[FIG.4]
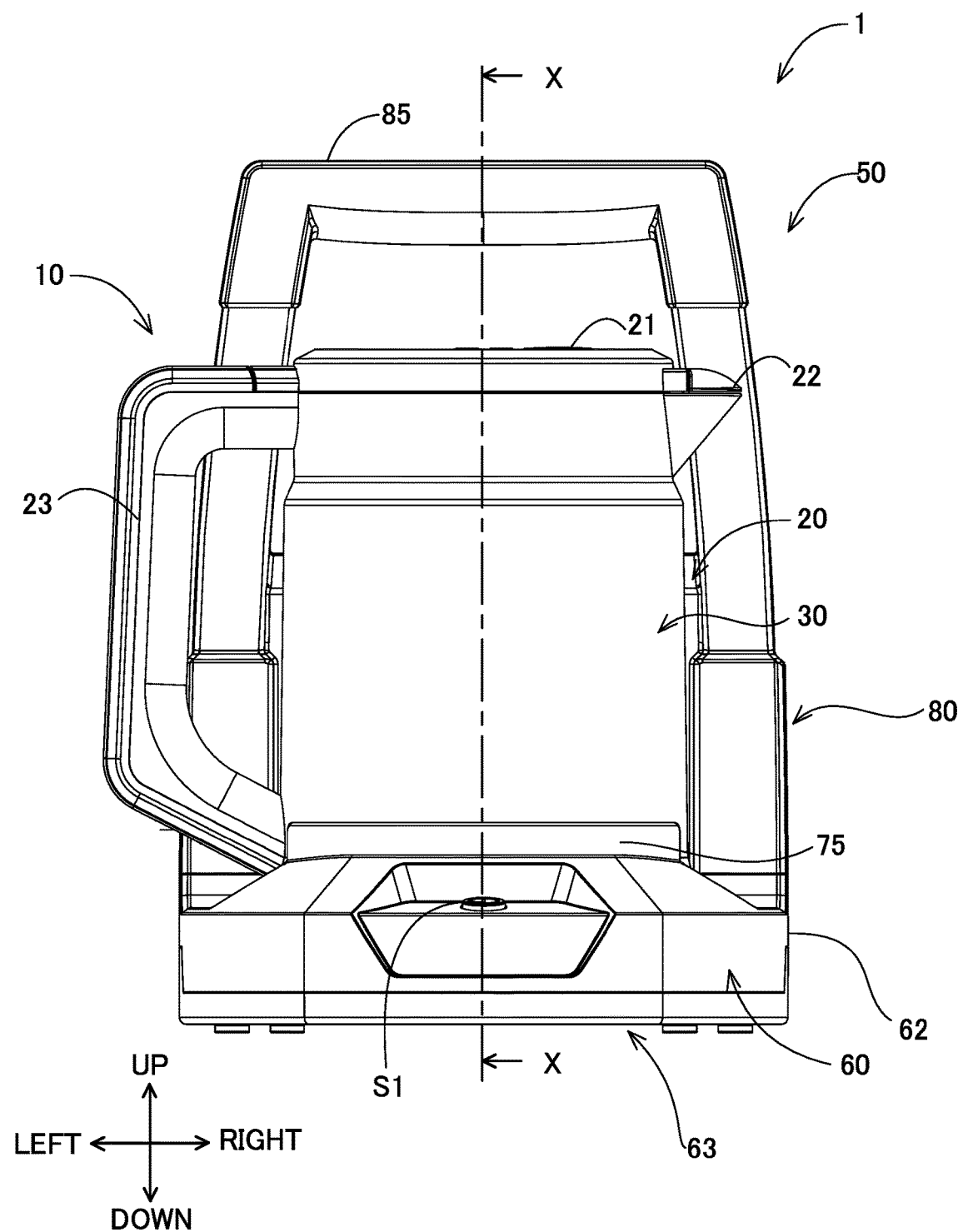

[FIG.5]
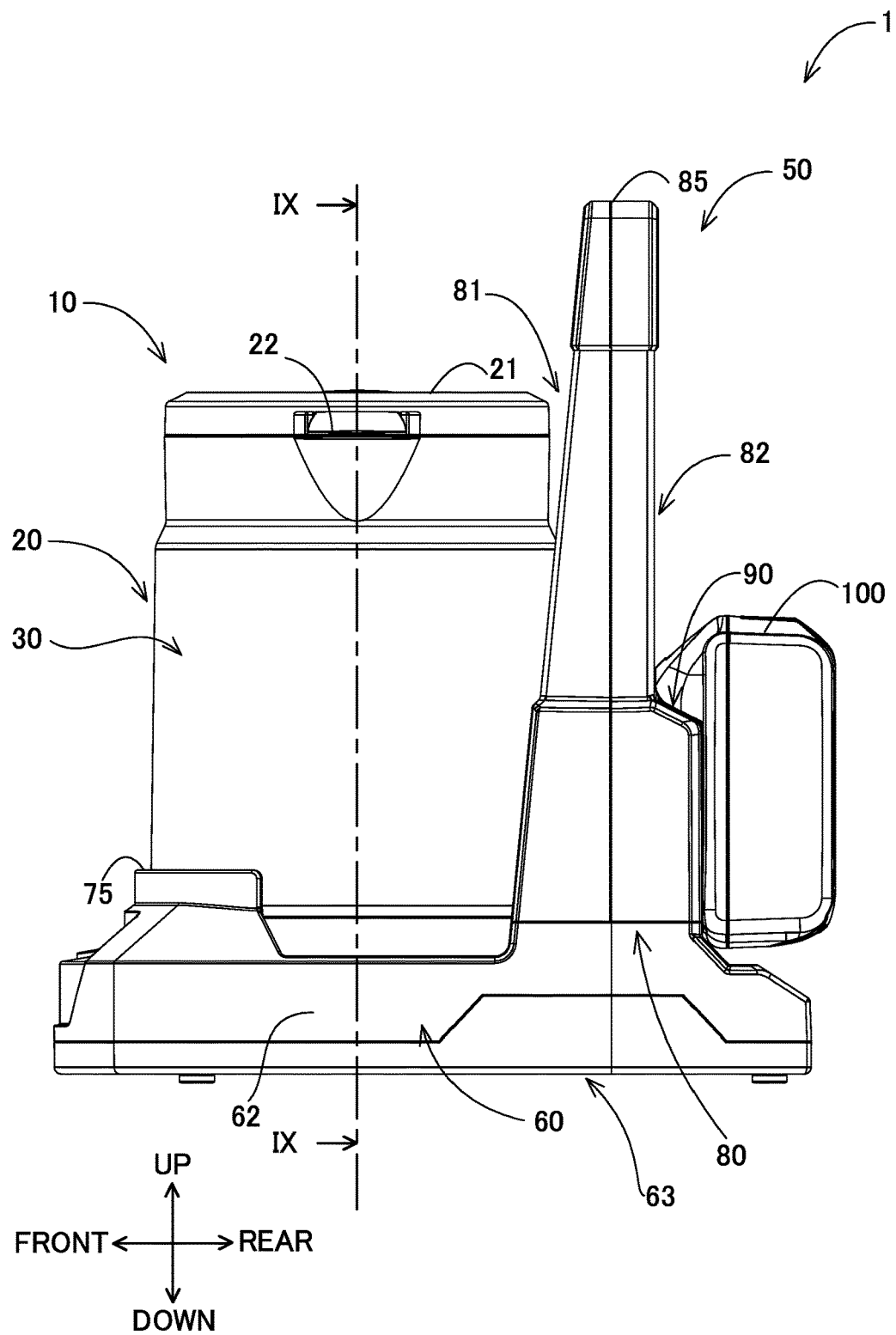

[FIG.6]
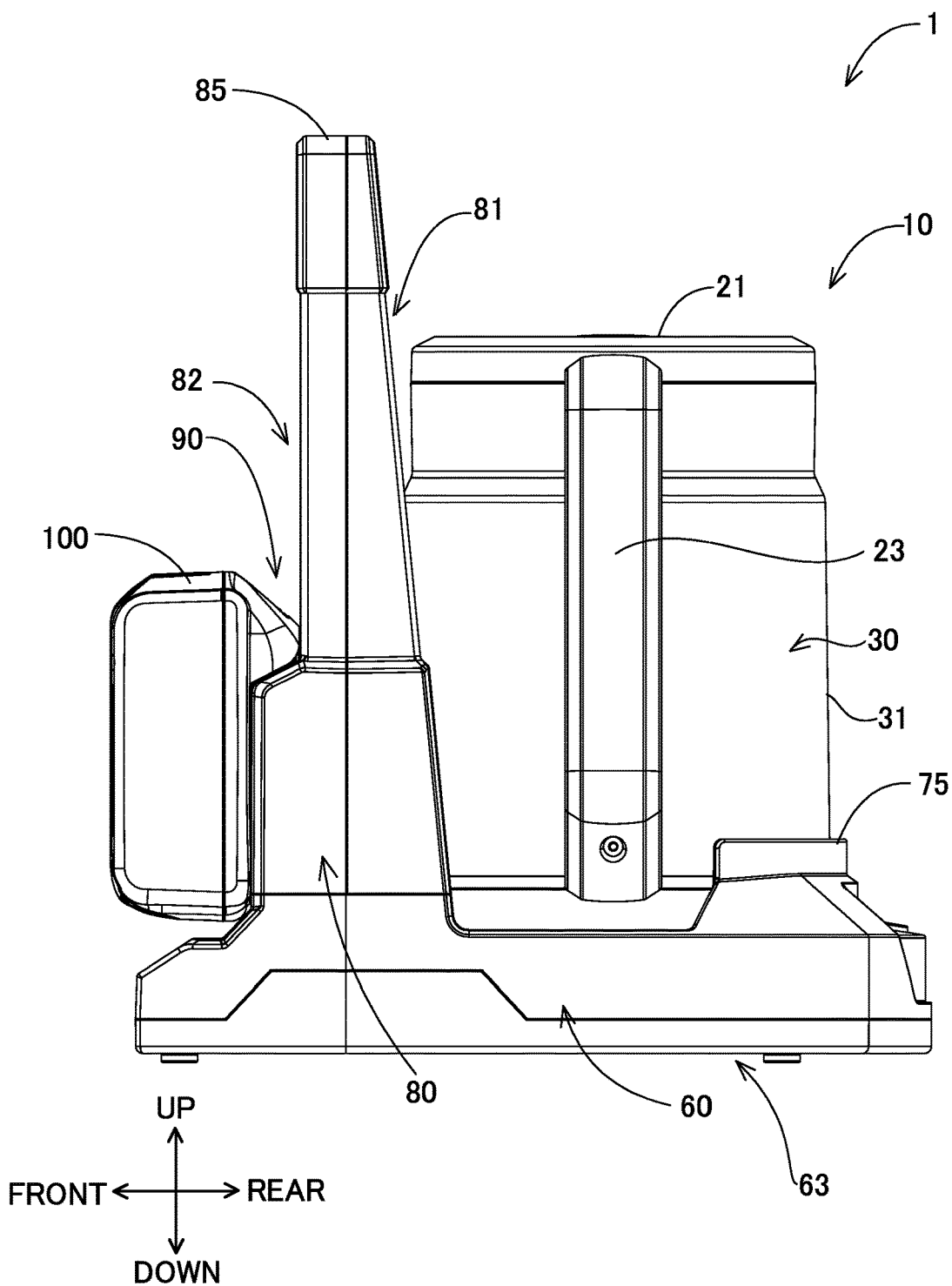

[FIG.7]
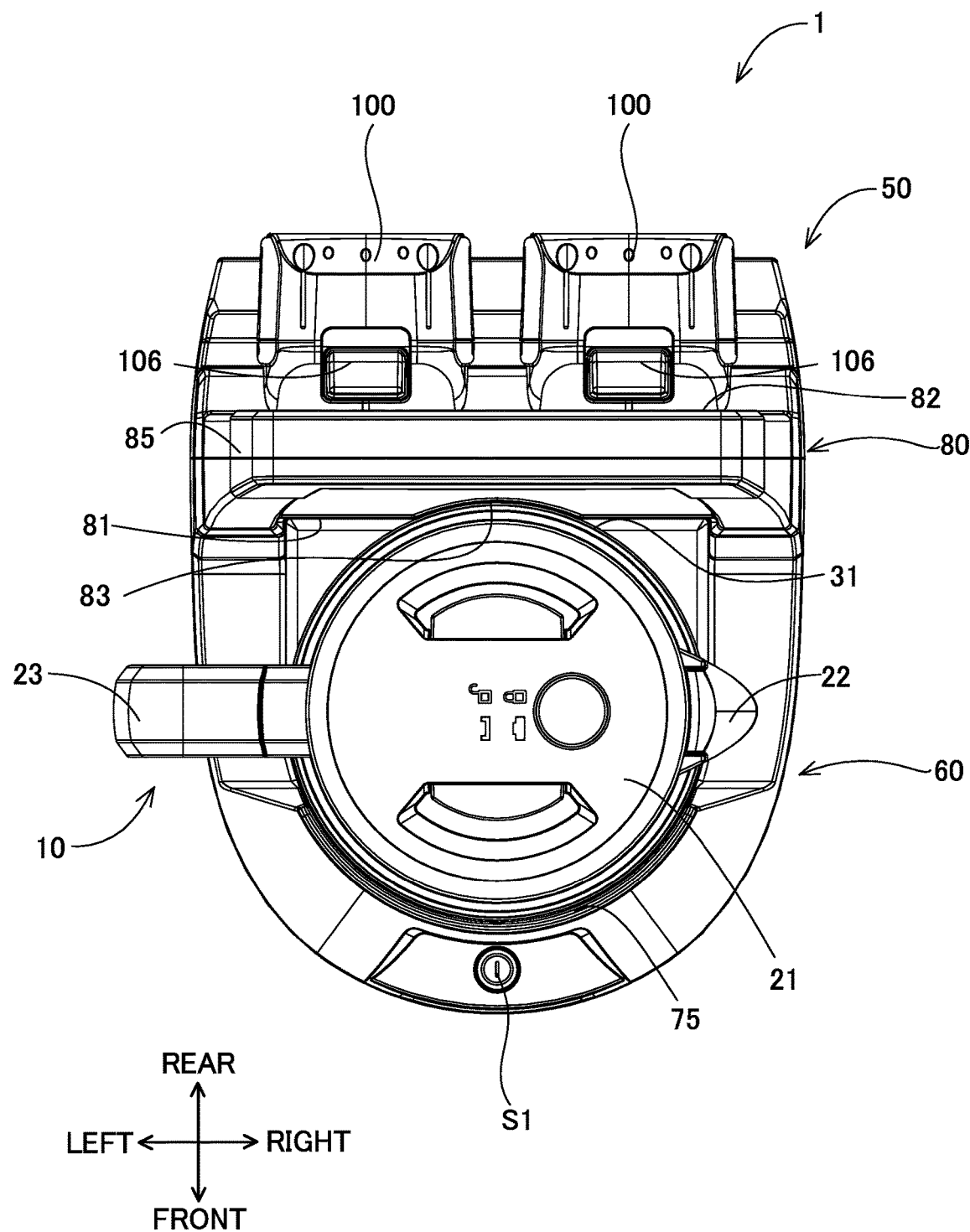

[FIG.8]
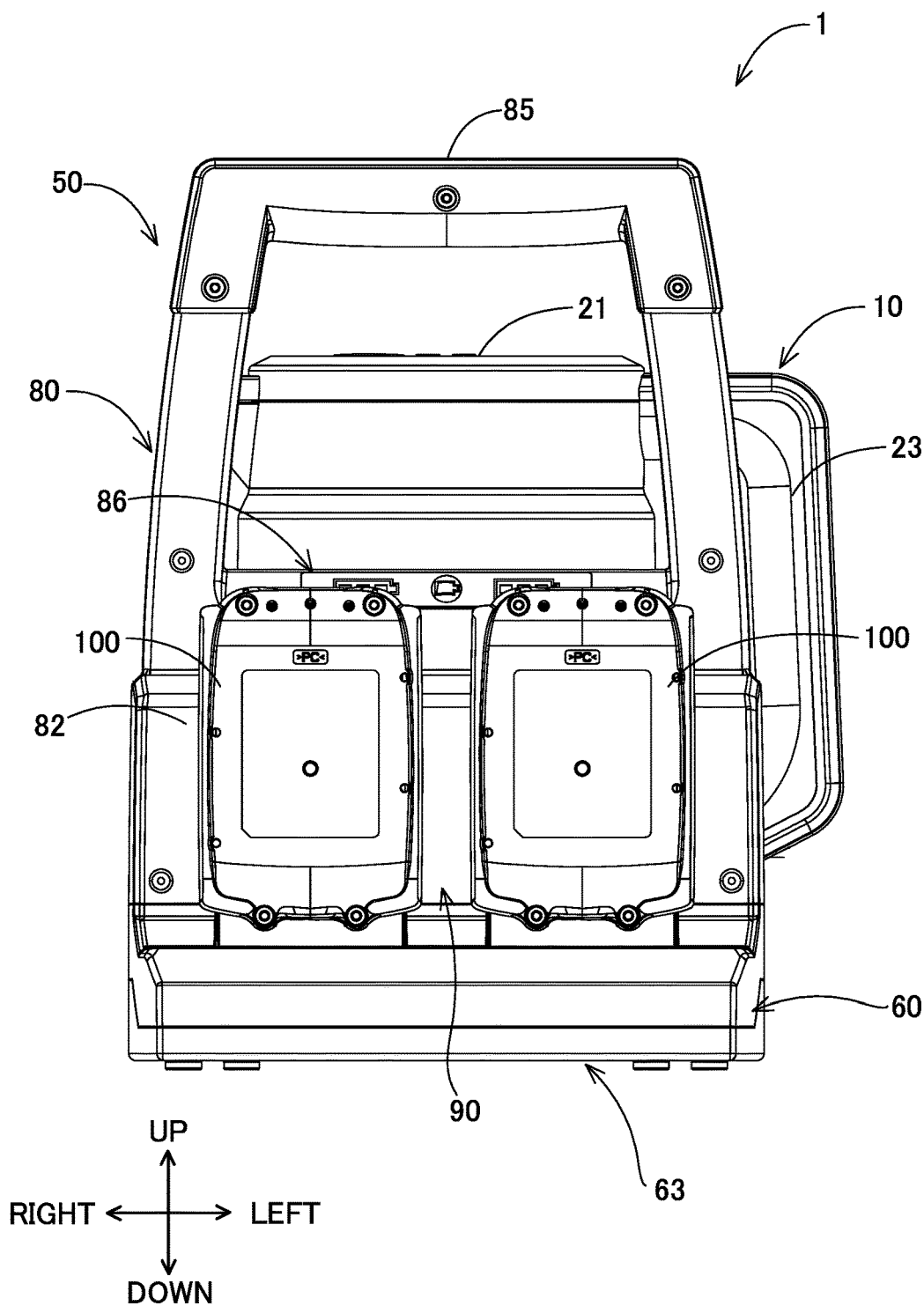

[FIG.9]
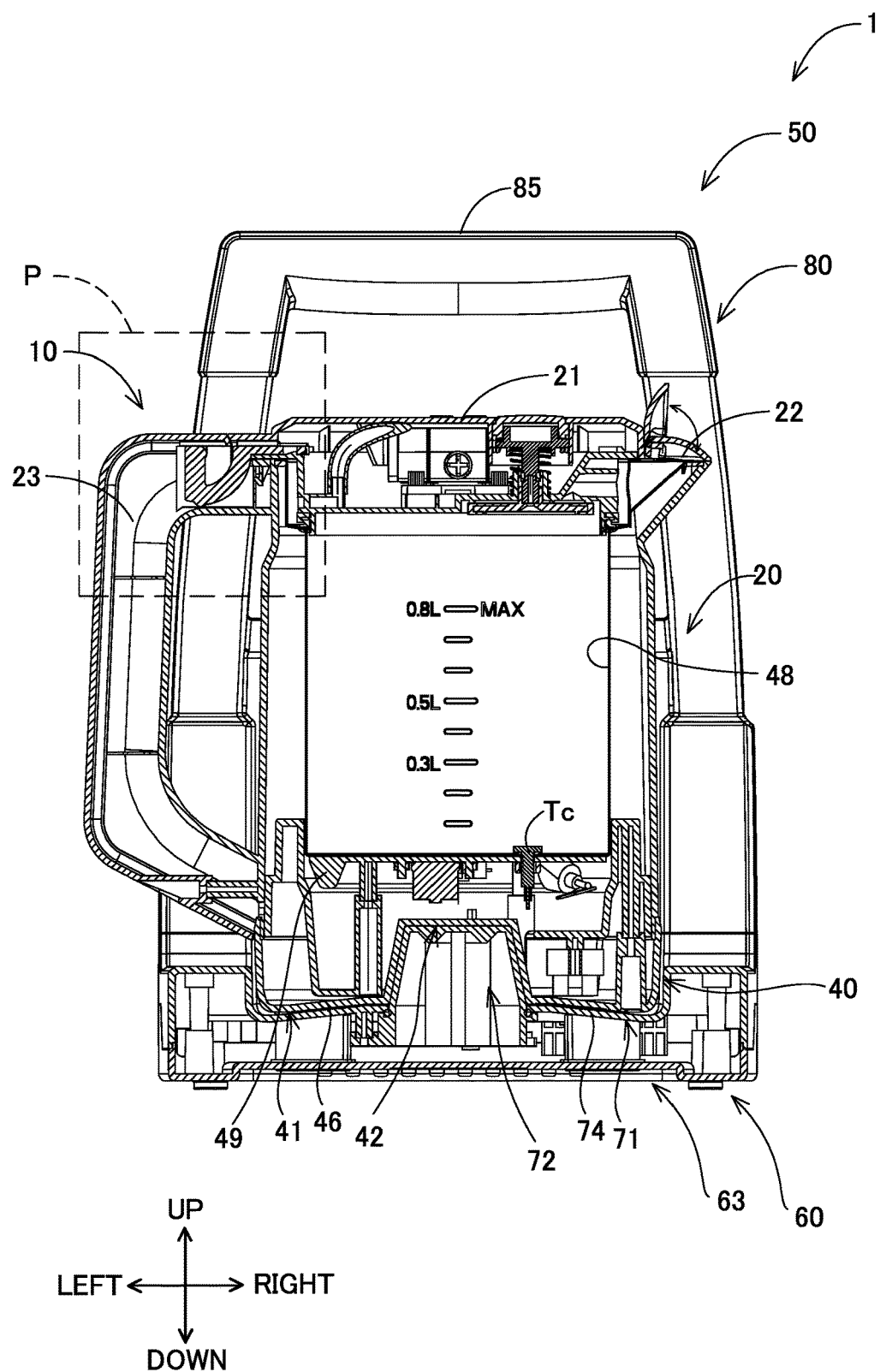

[FIG.10]
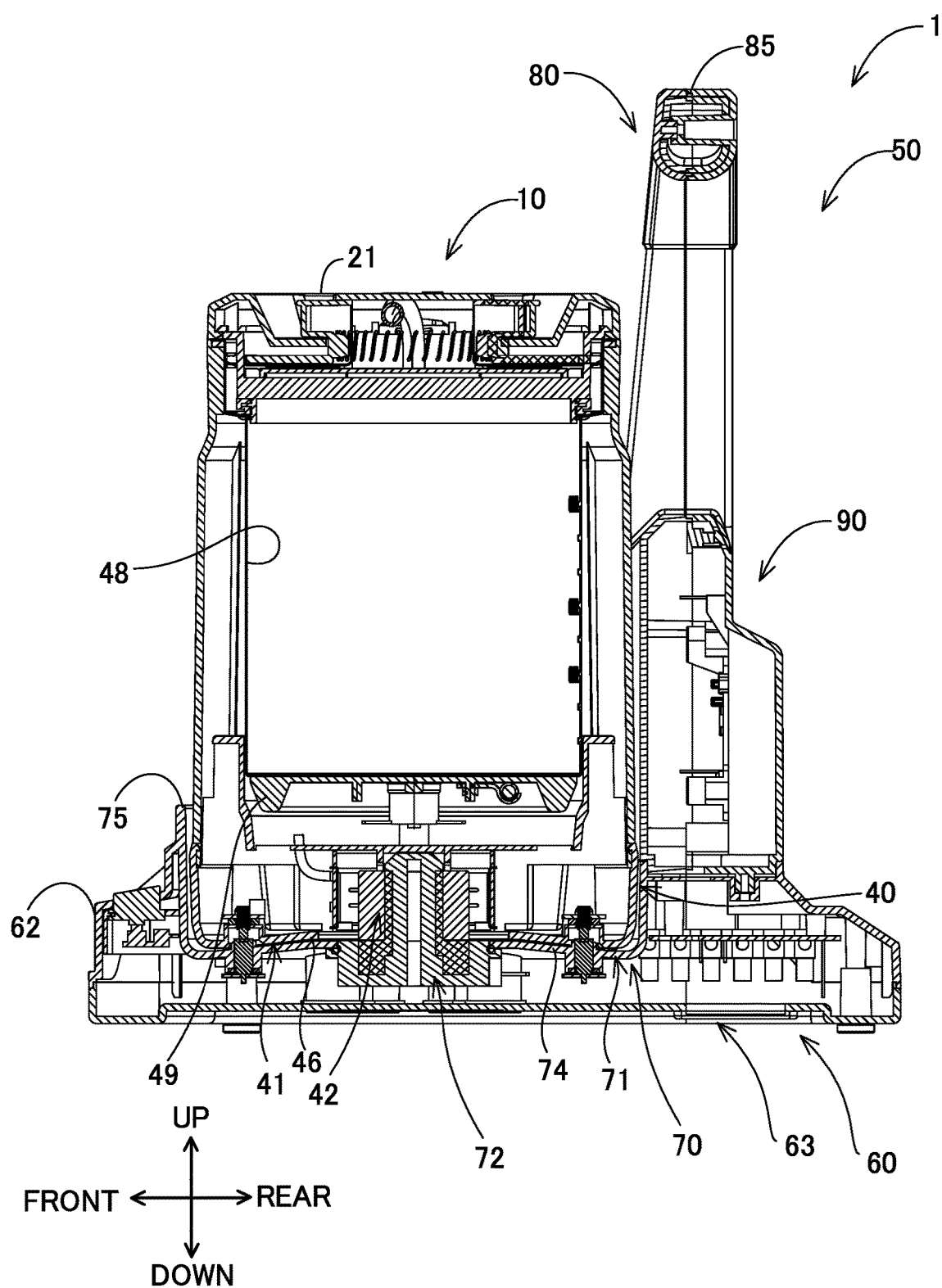

[FIG.11]
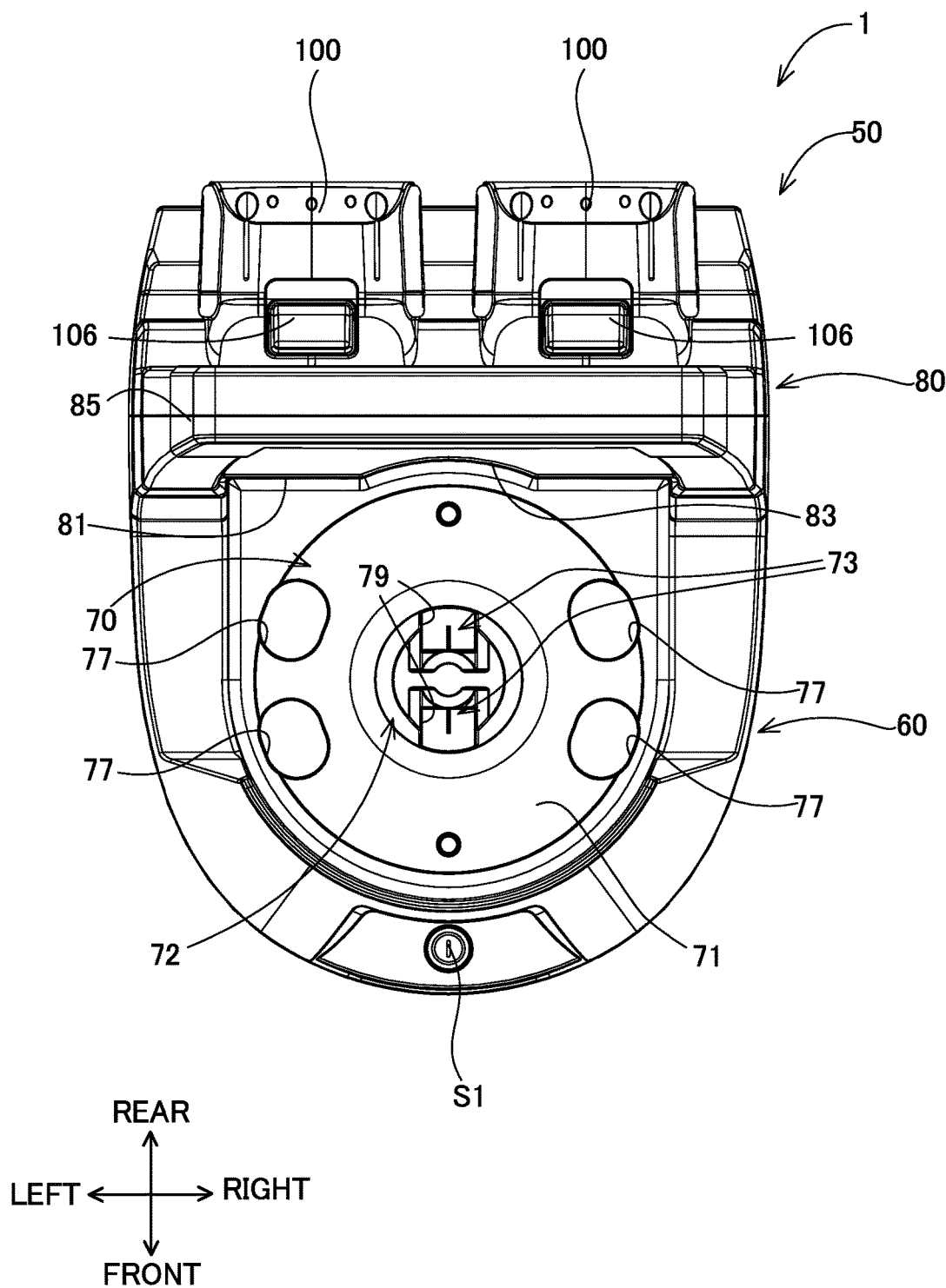

[FIG.12]
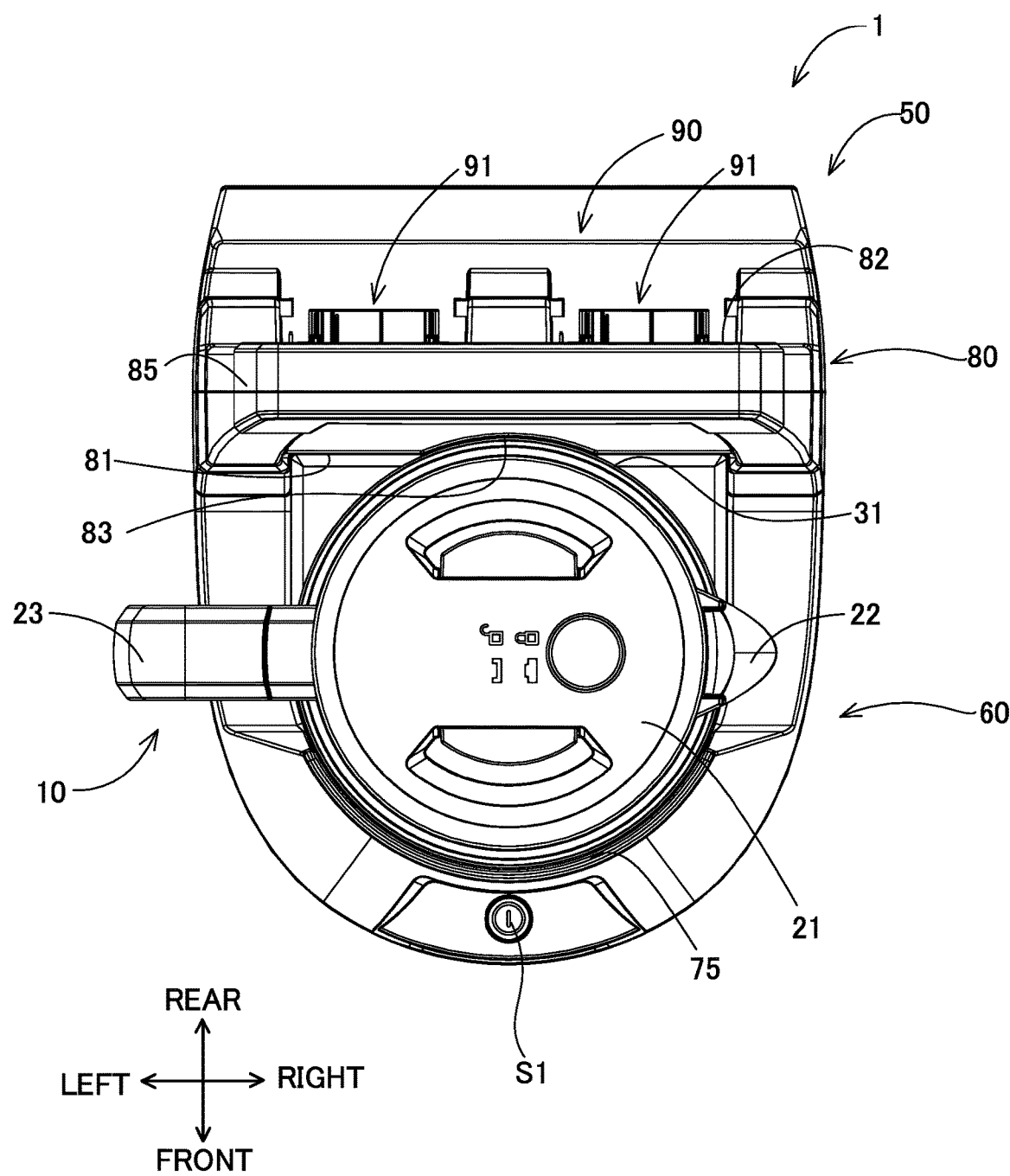

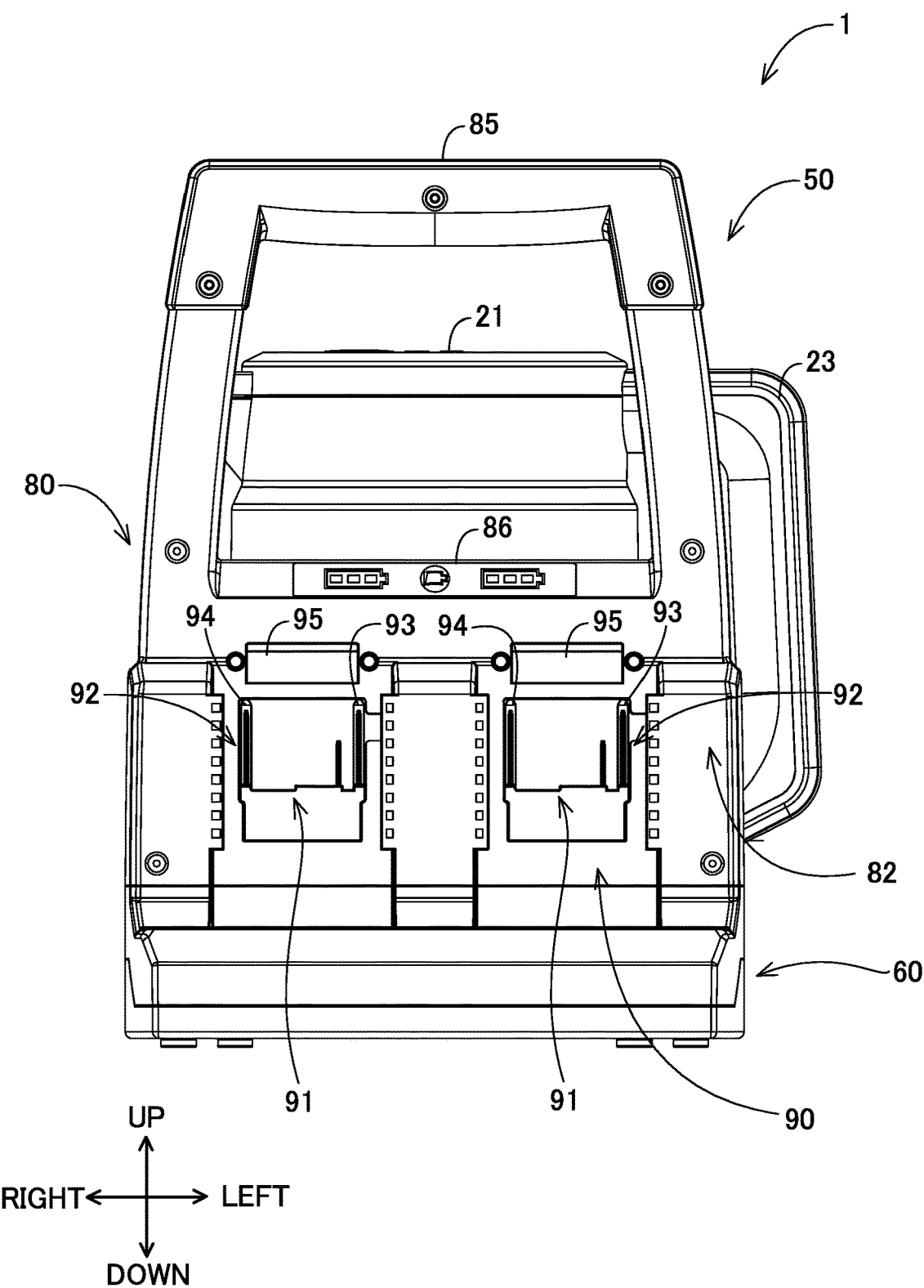
[FIG.13]

【FIG.14】
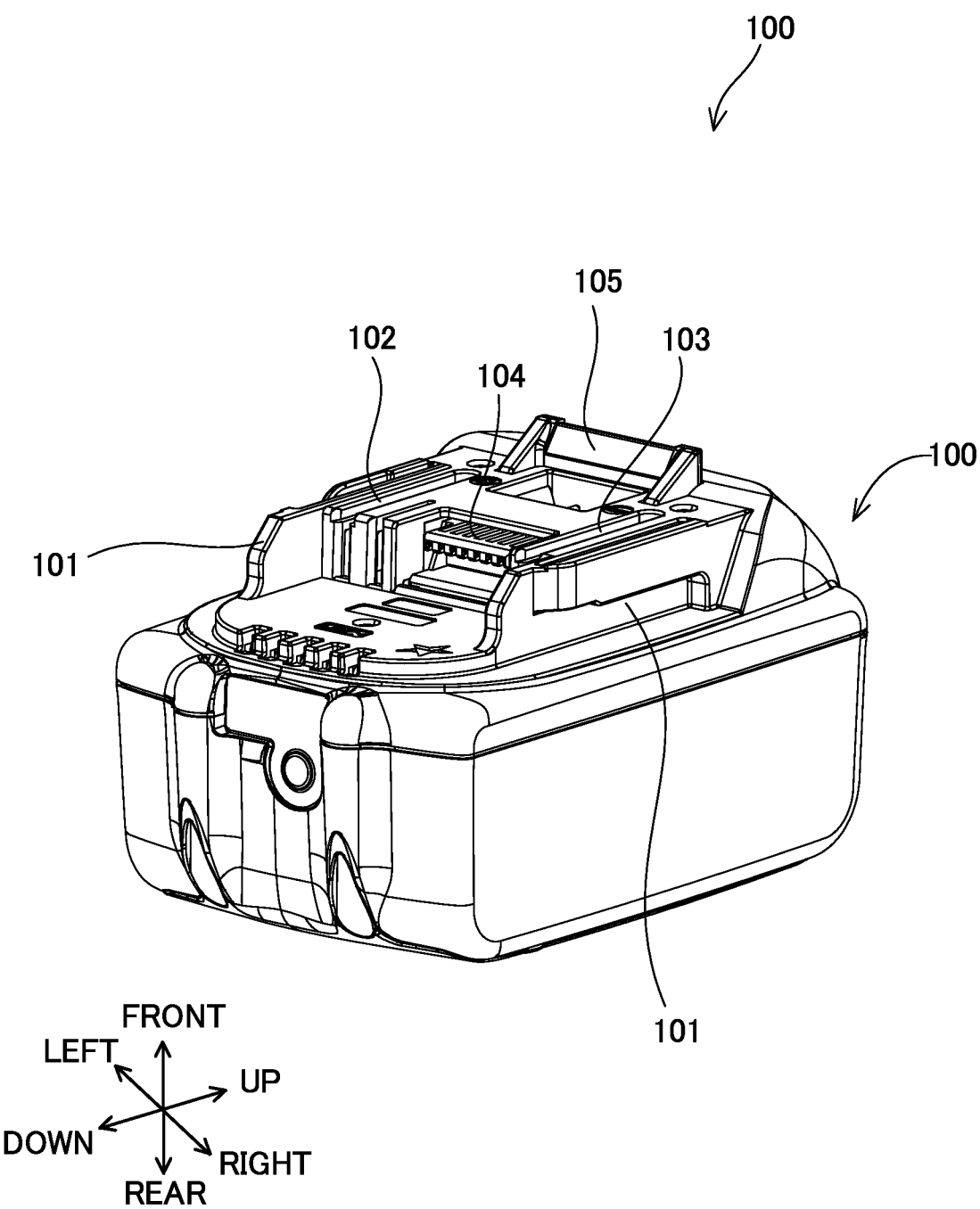

[FIG.15]
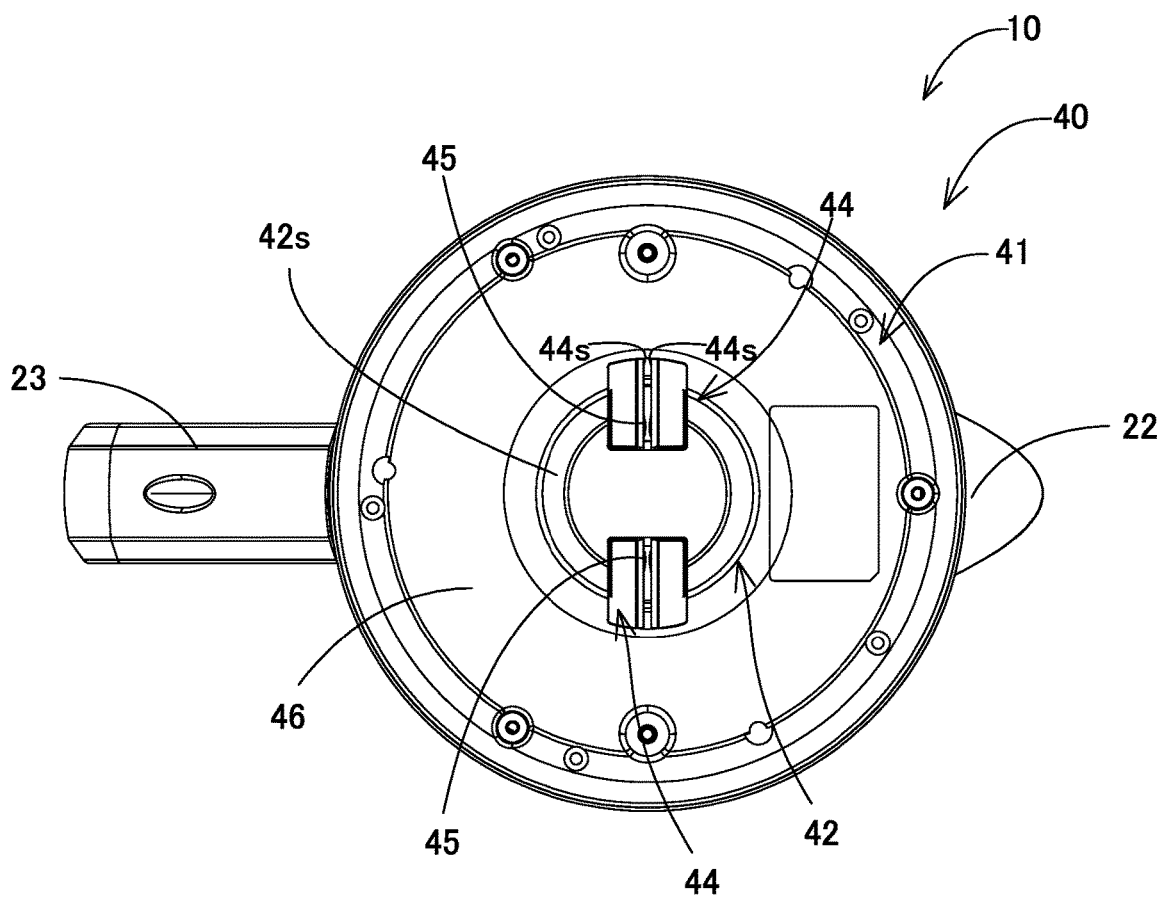
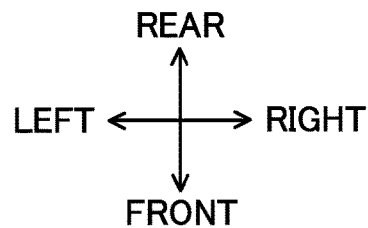

[FIG.16]
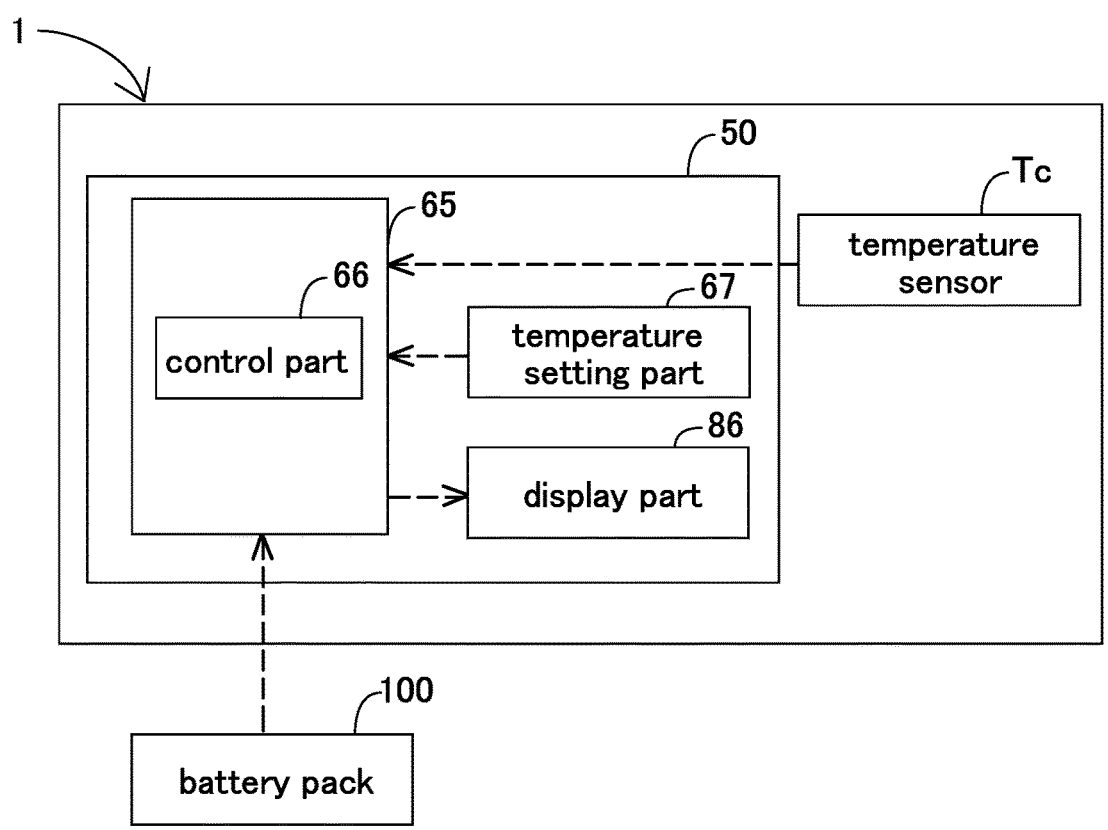

[FIG.17]
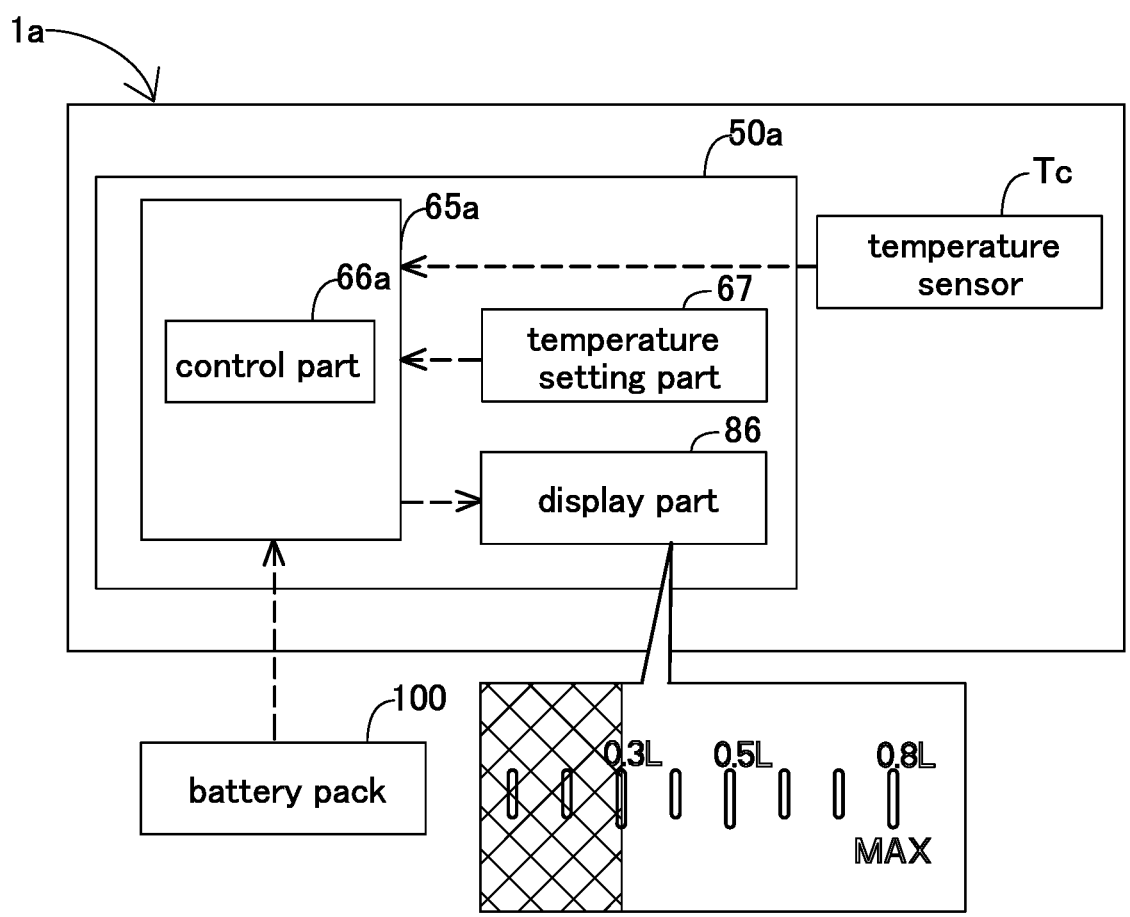

[FIG.18]
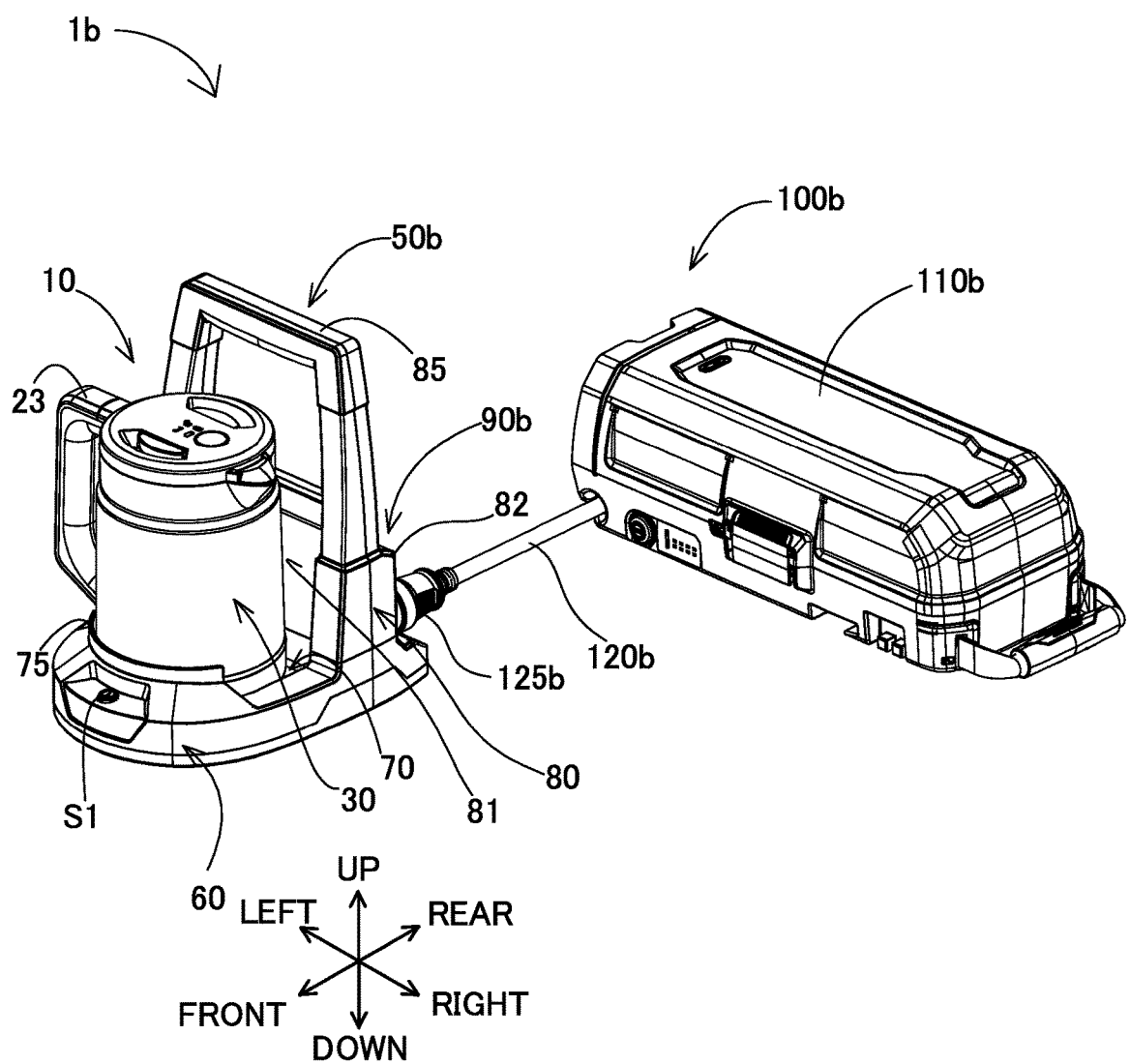

[FIG.19]
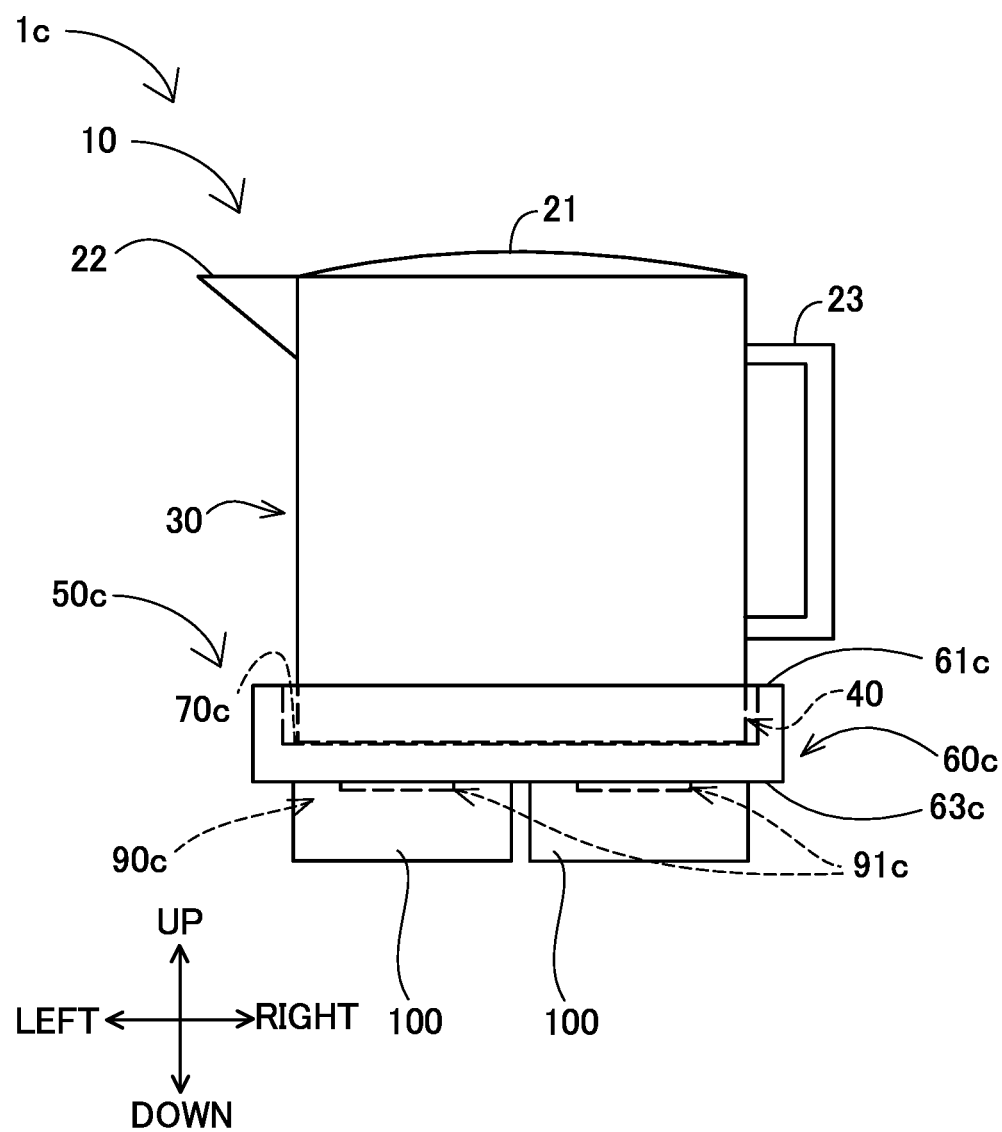

[FIG.20]
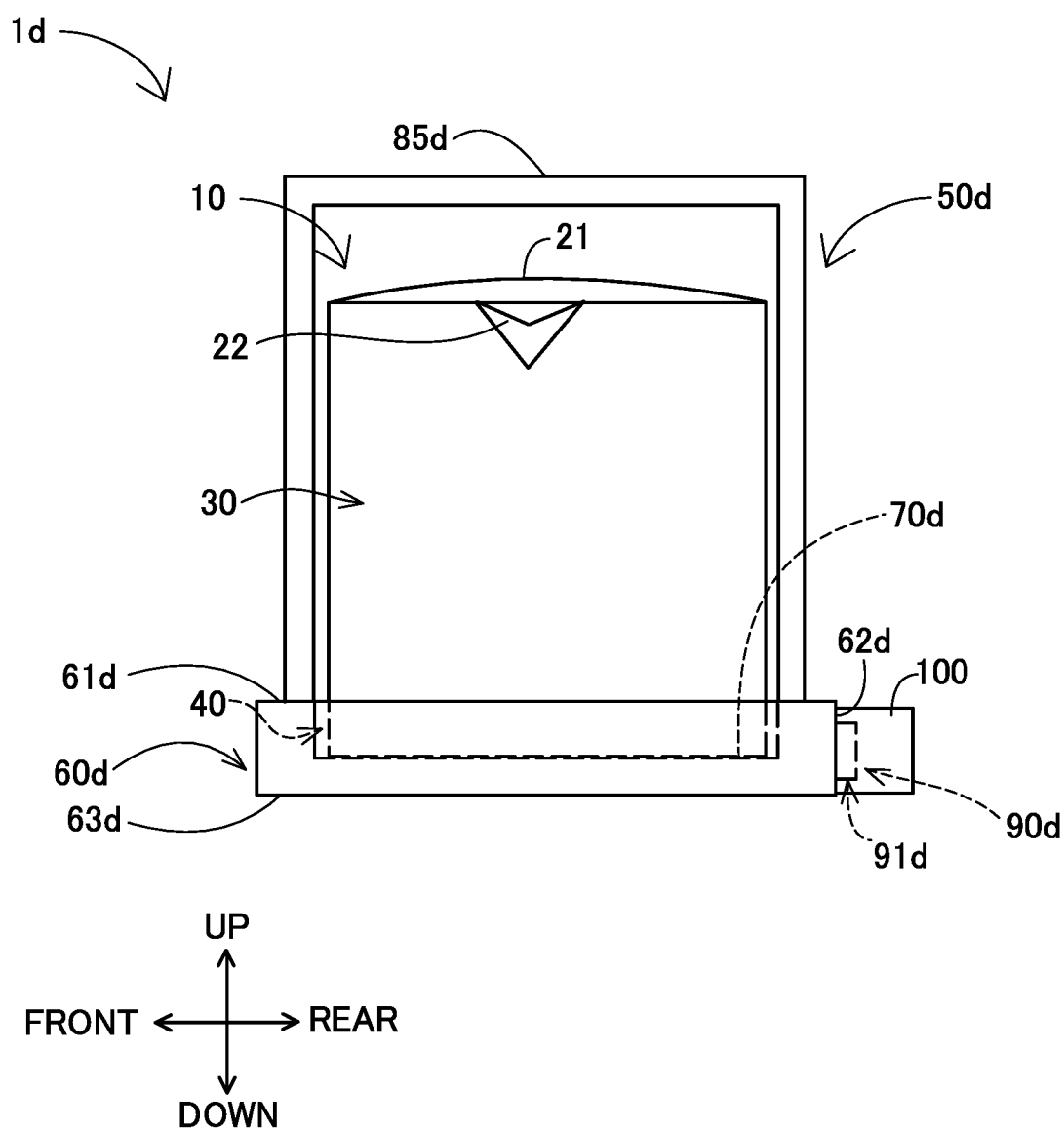

[FIG.21]
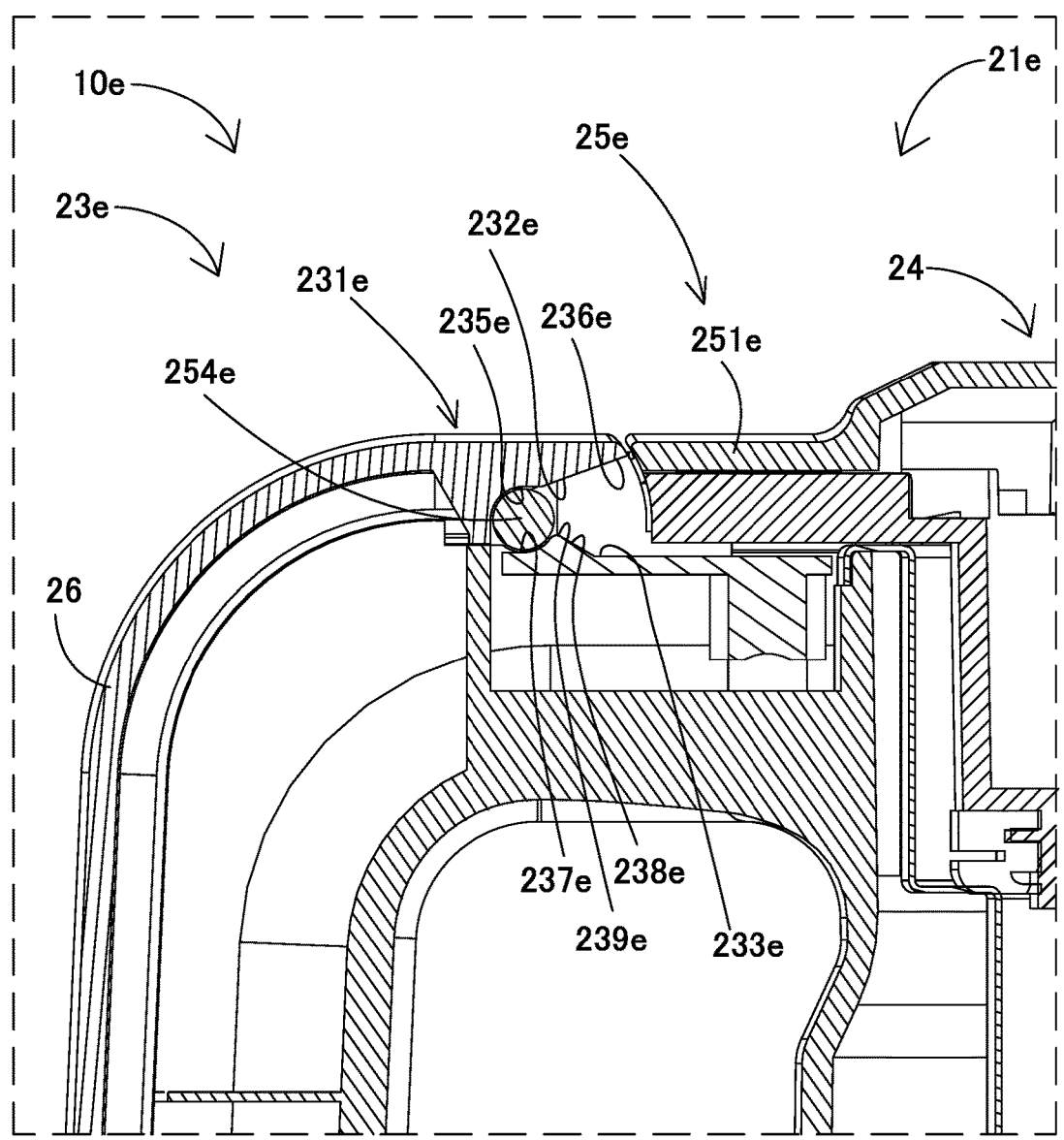

[FIG.22]
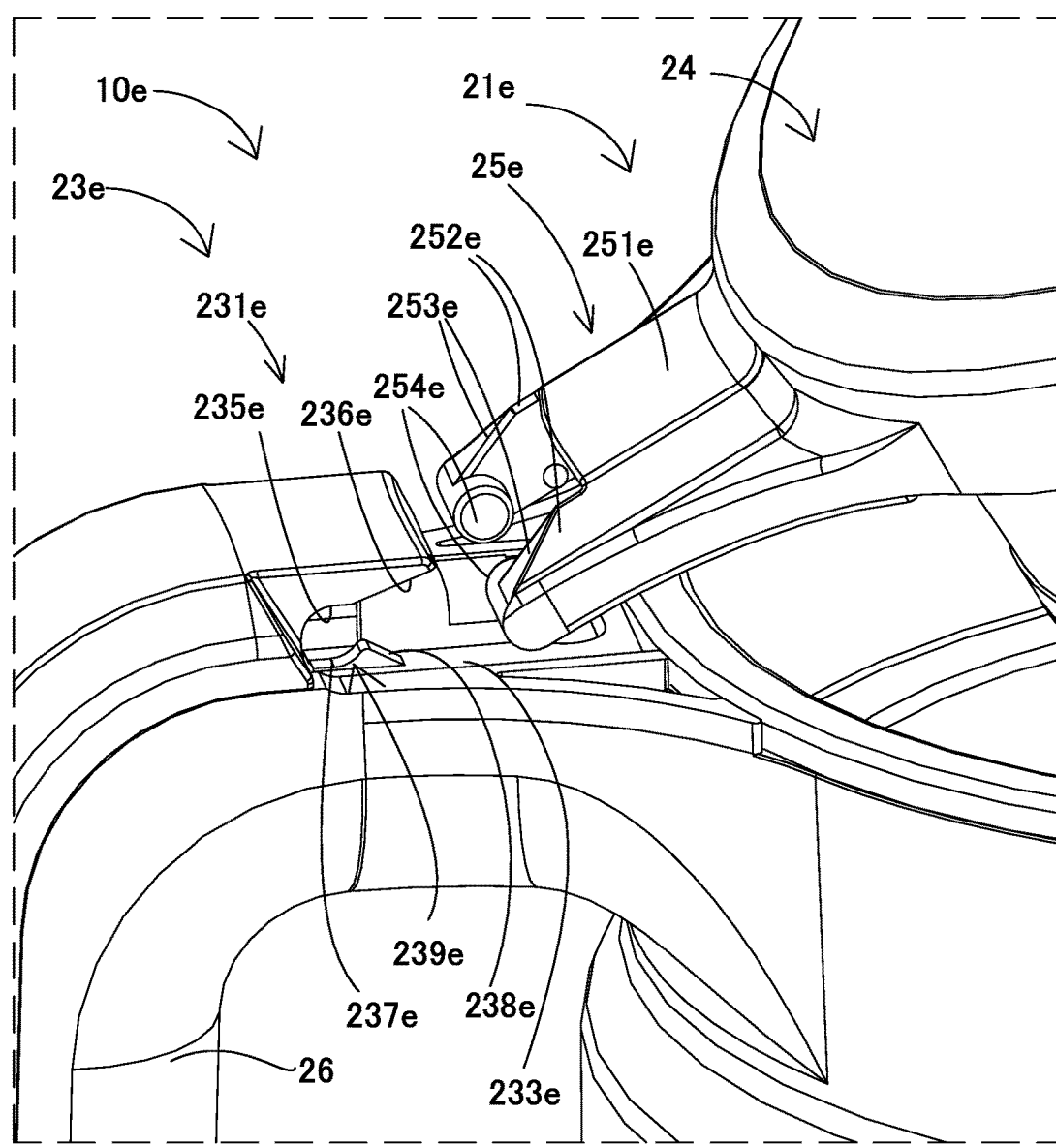

[FIG.23]
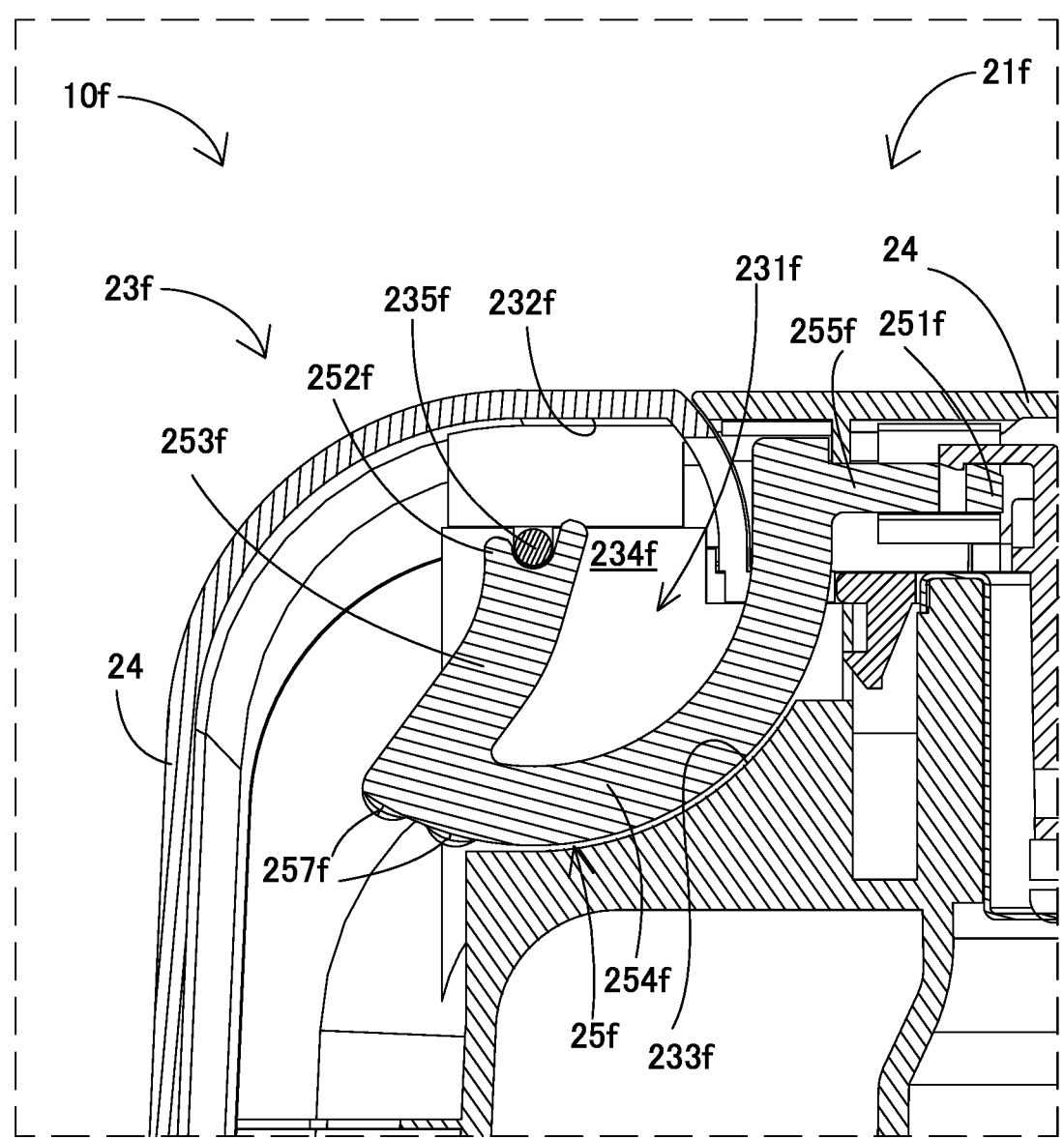

[FIG.24]
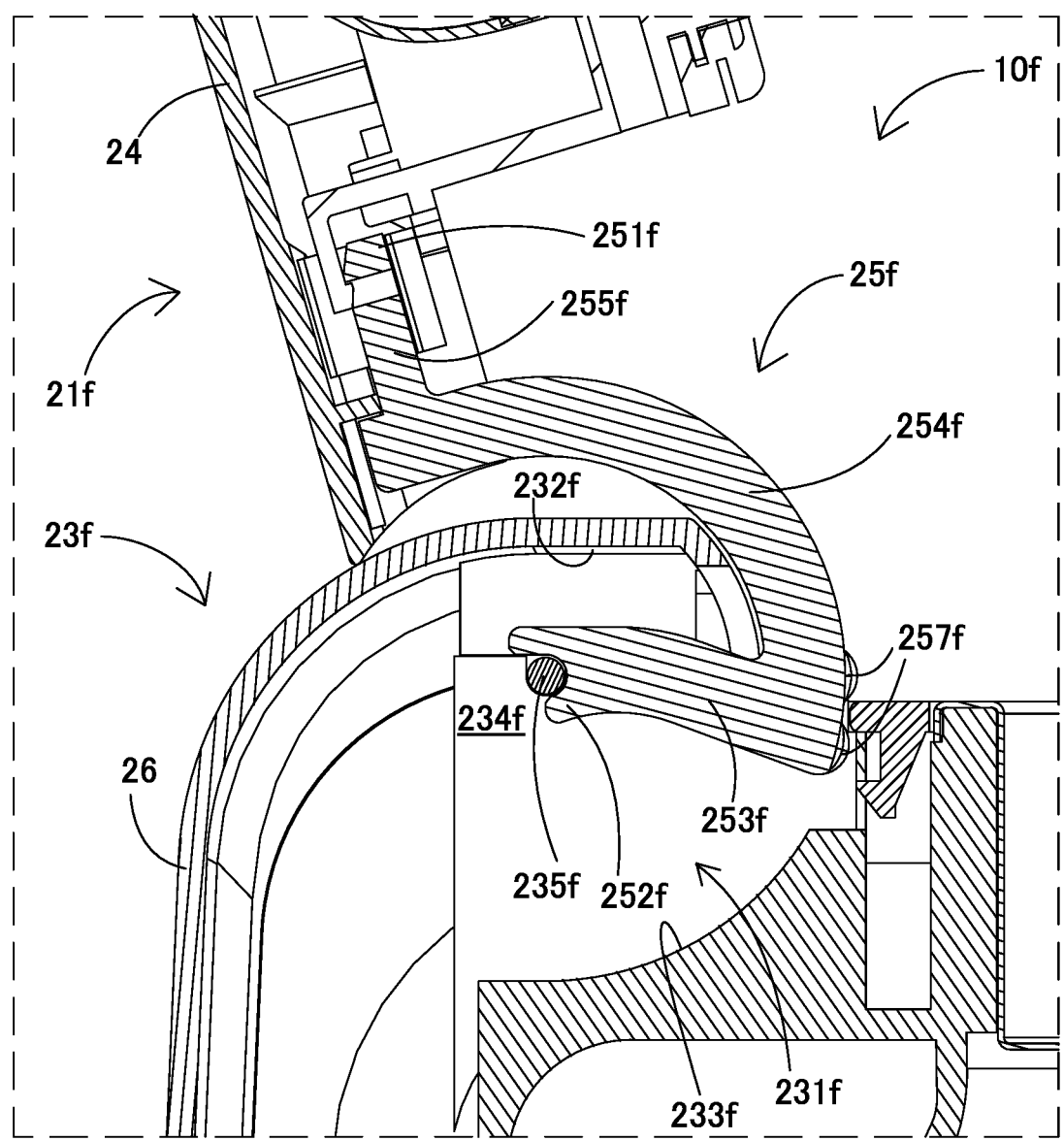

[FIG.25]
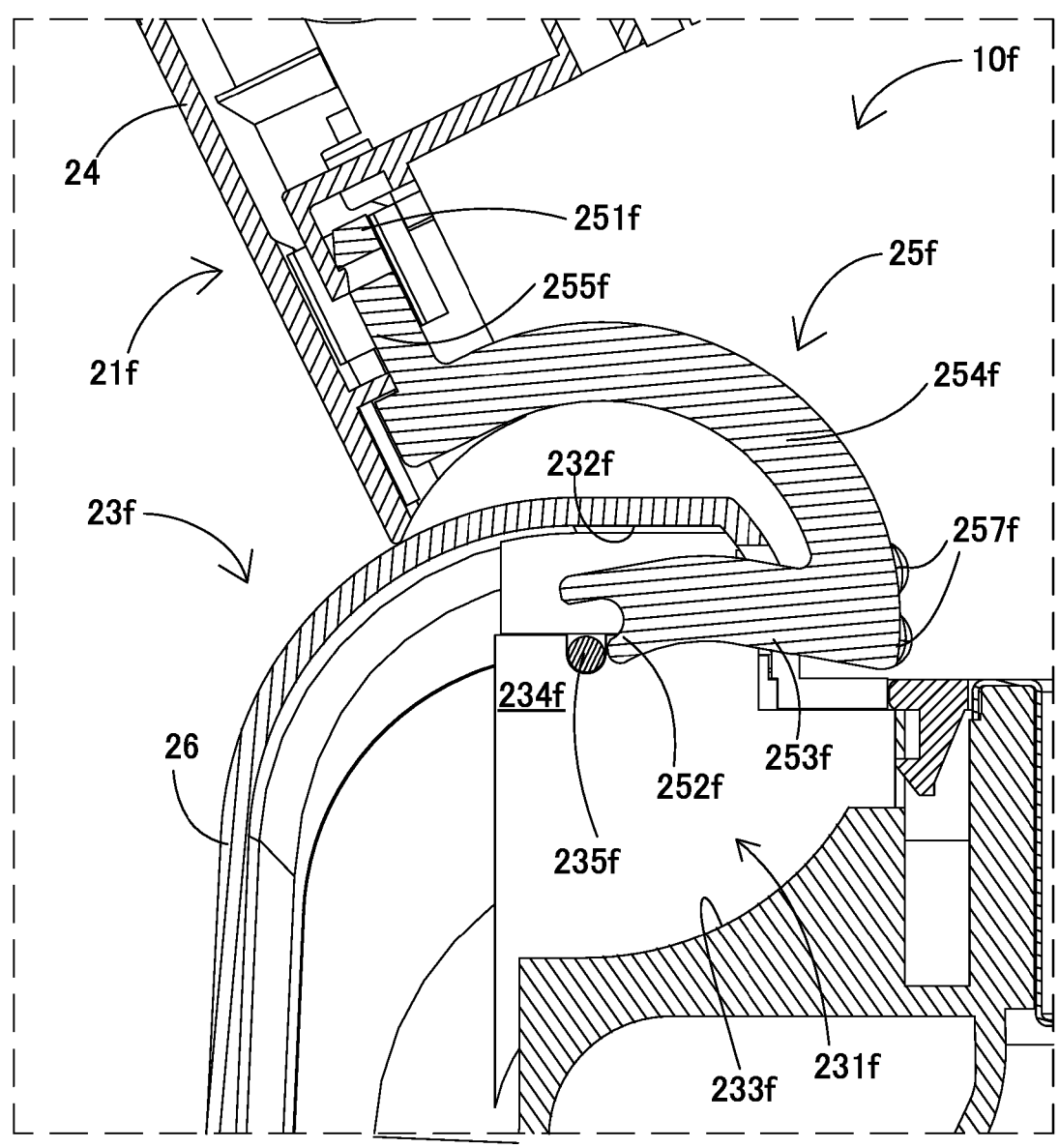

[FIG.26]
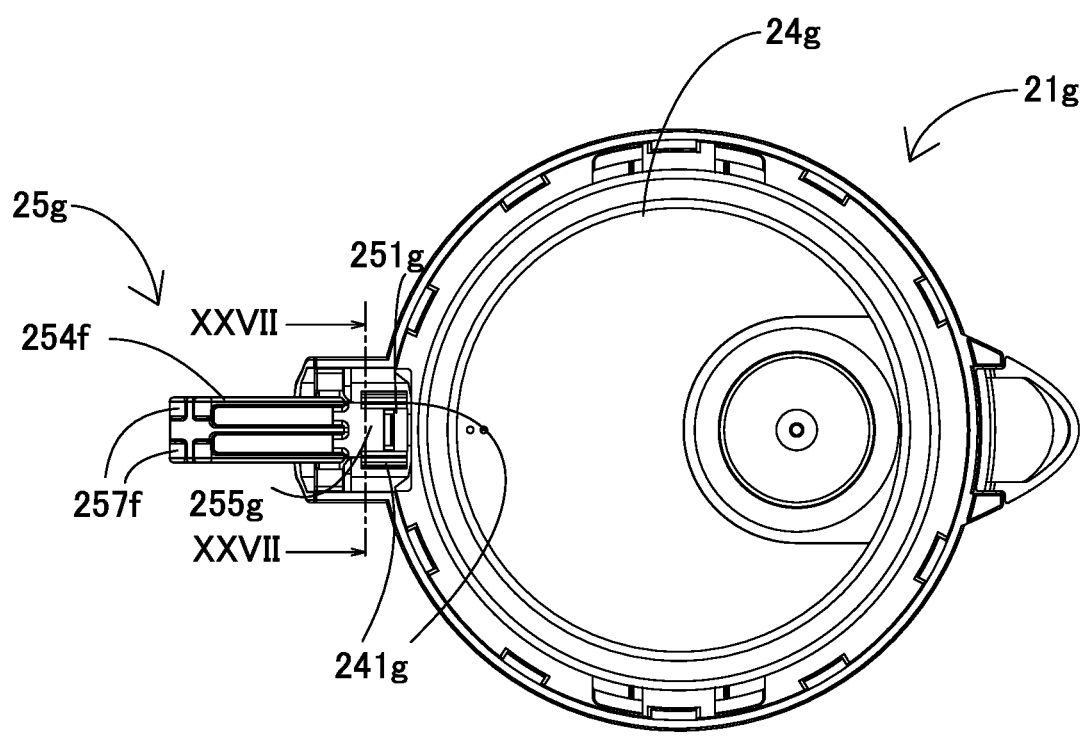

[FIG.27]
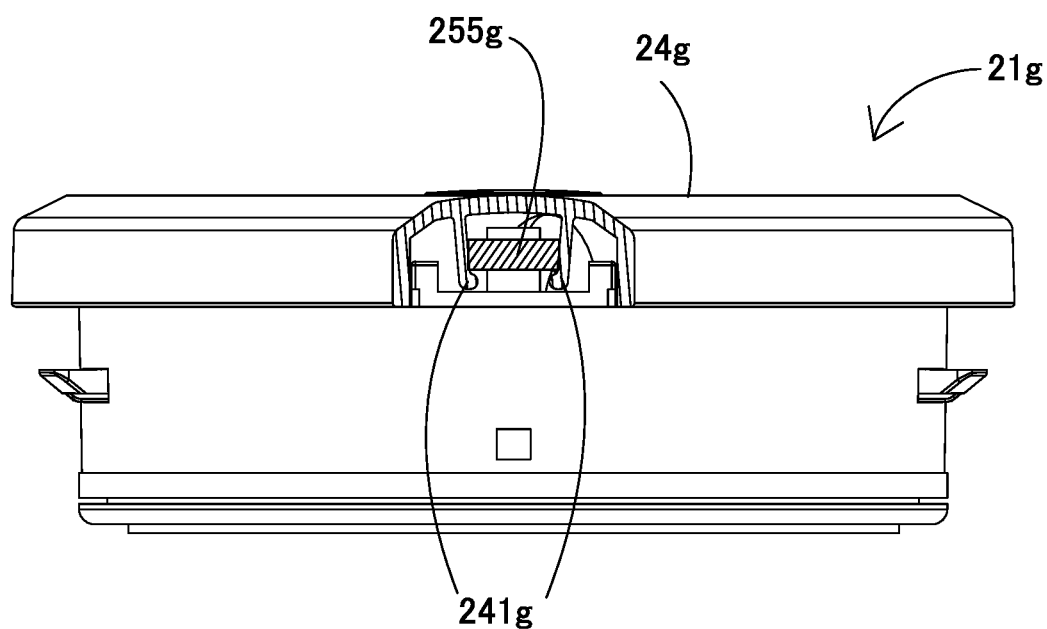

[FIG.28]
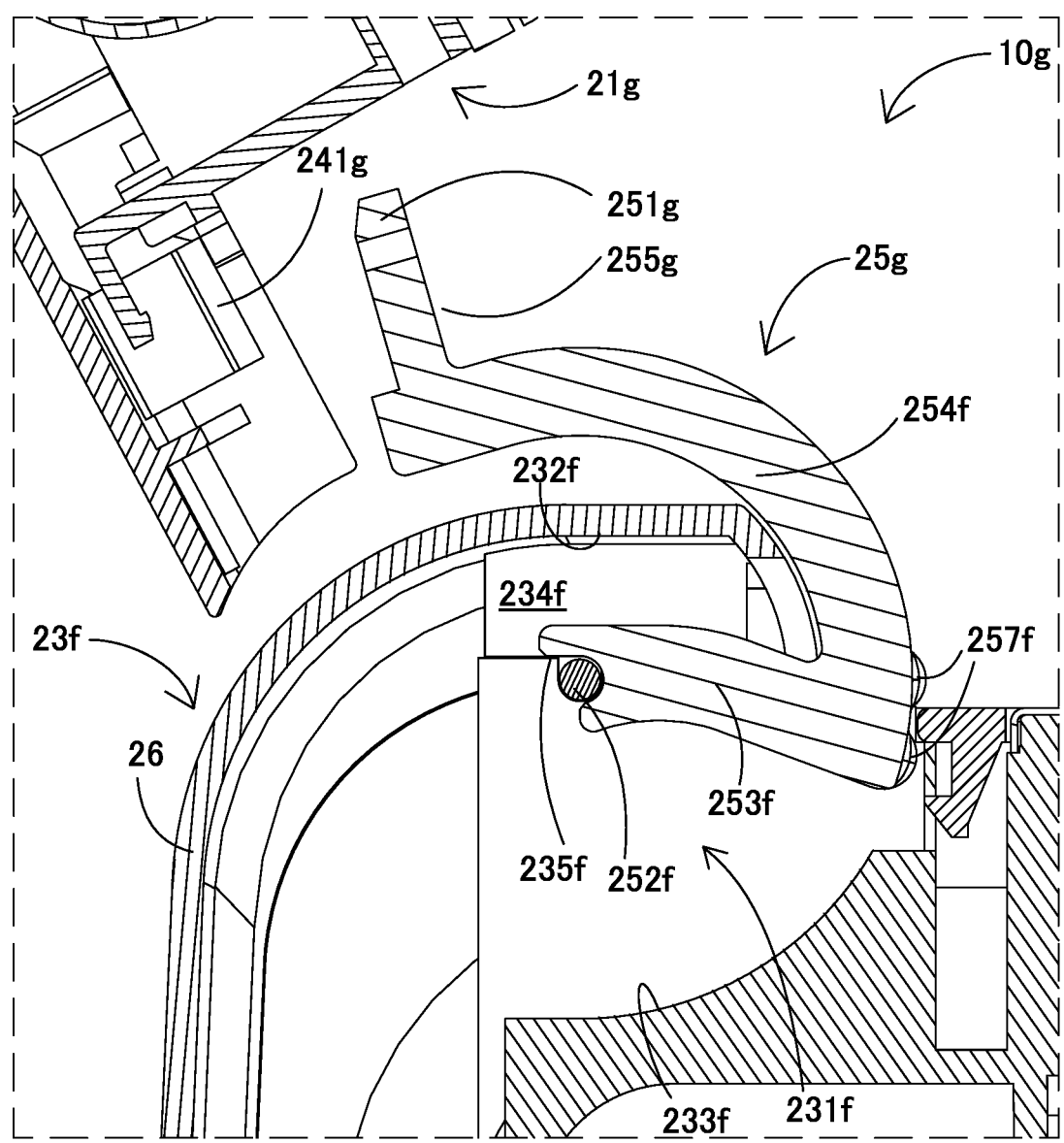

ELECTRIC KETTLE AND POWER SUPPLY UNIT

CROSS REFERENCE TO RELATED ART

The present application claims priority to Japanese Patent Application No. 2020-174758 filed on Oct. 16, 2020, the disclosure of which is hereby incorporated by reference in its entirety.

TECHNICAL FIELD

The present disclosure relates to an electric kettle including a kettle body and a power supply unit, and to a power supply unit.

BACKGROUND

Electric kettles for boiling water in a container with a heating device provided in the container are known. Japanese Patent No. 5657332 discloses an electric kettle in which a battery for supplying power to a heating device is mounted to a rear part of a container. The electric kettle of Japanese Patent No. 5657332 may be too heavy as a whole to be easy to handle, depending on the amount of water in the container and the weight of the battery. It is therefore desired to provide an electric kettle that is easier to handle.

SUMMARY

According to a first aspect of the present disclosure, an electric kettle is provided. The electric kettle has a kettle body and a power supply unit. The kettle body has a power receiving connection part and a heating part. The power receiving connection part is configured to receive power from an external power source, and the heating part is configured to heat liquid contained in the kettle body by the power the power receiving connection part receives. The power supply unit is configured such that the kettle body is placed thereon, and is configured to supply power to the kettle body. The power supply unit has a plate part, a power supply base and a mounting unit. The plate part has a first surface and a second surface. The power supply base is arranged on a side of the first surface of the plate part and configured such that the kettle body is placed on top thereof. The power supply base has a power supply connection part that is configured to be electrically removably connected to the power receiving connection part. The mounting unit is arranged on a side of the second surface of the plate part and configured such that a battery pack is removably coupled thereto as the external power source. The mounting unit is configured to supply power of the mounted battery pack to the heating part via the power supply connection part and the power receiving connection part.

According to this aspect, the power supply unit has the mounting unit configured such that the battery pack can be removably coupled thereto, which facilitates handling of the kettle body, compared with a structure in which the battery pack is coupled to the kettle body. Further, the power supply base on which the kettle body is placed is arranged on the first surface side of the plate part, while the mounting unit is arranged on the second surface side of the plate part. Thus, the possibility that liquid to be used for the electric kettle adheres to the mounting unit can be reduced, so that the safety and durability of the electric kettle is improved.

According to a second aspect of the present disclosure, an electric kettle is provided. The electric kettle has a kettle body and a power supply unit. The kettle body has a power receiving connection part and a heating part. The power receiving connection part is configured to receive power from an external power source, and the heating part is configured to heat liquid contained in the kettle body by the power the power receiving connection part receives. The power supply unit is configured such that the kettle body is placed thereon, and is configured to supply power to the kettle body. The power supply unit has a power supply base, a mounting unit and a grip part. The power supply base is configured such that the kettle body is placed on top thereof. The power supply base has a power supply connection part that is configured to be electrically removably connected to the power receiving connection part. The mounting unit is configured such that a battery pack is removably coupled thereto as the external power source. The mounting unit is configured to supply power of the mounted battery pack to the heating part via the power supply connection part and the power receiving connection part. The grip part extends upward from the power supply base and is configured to be held by a user.

According to this aspect, the power supply unit has the mounting unit configured such that the battery pack can be removably coupled thereto which facilitates handling of the kettle body, compared with a structure in which the battery pack is coupled to the kettle body. Further, the power supply unit has the grip part that is connected to the power supply base and extends upward from the power supply base. Thus, the user can hold the grip part and carry the power supply unit alone or carry the kettle body and the power supply unit together.

According to a third aspect of the present disclosure, a power supply unit is provided which is configured such that a kettle body is placed thereon. The kettle body has a power receiving connection part configured to receive power from an external power source, and a heating part configured to heat liquid contained in the kettle body by the power the power receiving connection part receives. The power supply unit has a plate part, a power supply base and a mounting unit. The plate part has a first surface and a second surface. The power supply base is arranged on a side of the first surface of the plate part and configured such that the kettle body is placed on top thereof. The power supply base has a power supply connection part that is electrically removably connected to the power receiving connection part. The mounting unit is arranged on a side of the other surface of the plate part and configured such that a battery pack is removably coupled thereto as the external power source. The mounting unit is configured to supply power of the mounted battery pack to the heating part via the power supply connection part and the power receiving connection part.

According to this aspect, the power supply unit has the mounting unit configured such that the battery pack can be removably coupled thereto, which facilitates handling of the kettle body, compared with a structure in which the battery pack is coupled to the kettle body. Further, the power supply base on which the kettle body is placed is arranged on the first surface side of the plate part, while the mounting unit is arranged on the second surface side of the plate part. Thus, the possibility that liquid to be used for the kettle body adheres to the mounting unit can be reduced, so that the safety and durability of the power supply unit is improved.

BRIEF DESCRIPTION OF THE DRAWINGS

FIG. 1 is a perspective view of an electric kettle 1 with a battery pack 100 mounted thereon.

FIG. 2 is a perspective view of the electric kettle 1 with a kettle body 10 removed from a power supply unit 50.

FIG. 3 is an enlarged perspective view of a power supply connection part 72.

FIG. 4 is a front view of the electric kettle 1 with the battery pack 100 mounted thereon.

FIG. 5 is a right side view of the electric kettle 1 with the battery pack 100 mounted thereon.

FIG. 6 is a left side view of the electric kettle 1 with the battery pack 100 mounted thereon.

FIG. 7 is a top view of the electric kettle 1 with the battery pack 100 mounted thereon.

FIG. 8 is a back view of the electric kettle 1 with the battery pack 100 mounted thereon.

FIG. 9 is a sectional view of the electric kettle 1, taken along line IX-IX in FIG. 5.

FIG. 10 is a sectional view of the electric kettle 1, taken along line X-X in FIG. 4.

FIG. 11 is a top view of the power supply unit 50 with the battery pack 100 mounted thereon.

FIG. 12 is a top view of the electric kettle 1.

FIG. 13 is a back view of the electric kettle 1.

FIG. 14 shows an example of the battery pack 100.

FIG. 15 is a bottom view of the kettle body 10.

FIG. 16 is a block diagram showing the system configuration of the electric kettle 1.

FIG. 17 is a block diagram showing the system configuration of an electric kettle 1a according to a second embodiment.

FIG. 18 is a perspective view of an electric kettle 1b according to a third embodiment.

FIG. 19 is a schematic view of an electric kettle 1c according to a fourth embodiment.

FIG. 20 is a schematic view of an electric kettle 1d according to a fifth embodiment.

FIG. 21 is a partial, enlarged sectional view of a kettle body 10e for a first connecting structure.

FIG. 22 is an enlarged perspective view for illustrating the state of a lid 21e removed from a kettle grip part 23e.

FIG. 23 is a partial, enlarged sectional view of a kettle body 10f for a second connecting structure.

FIG. 24 is a partial, enlarged sectional view for illustrating the opened state of a lid 21f.

FIG. 25 is a partial, enlarged sectional view for illustrating the state of the lid 21f removed from a kettle grip part 23f.

FIG. 26 is a bottom view of a lid 21g of a kettle body 10g for a third connecting structure.

FIG. 27 is a sectional view taken along line XXVII-XXVII in FIG. 26.

FIG. 28 is a partial, enlarged sectional view for illustrating the state of a lid body 24g removed from a connecting member 25g.

DETAILED DESCRIPTION OF THE EMBODIMENTS

In at least one embodiment of the present disclosure, the plate part may be connected to the power supply base and formed to extend upward from the power supply base, and the mounting unit may be arranged on the second surface of the plate part.

According to this embodiment, the possibility that the liquid in the kettle body adheres to the mounting unit can be reduced.

In at least one embodiment of the present disclosure, the mounting unit may have a rail that extends in an up-down direction and that is configured such that the battery pack is removably coupled thereto by sliding in the up-down direction.

According to this embodiment, even if the liquid in the kettle body adheres to the rail, the liquid can easily drop downward, so that the safety and durability of the electric kettle is further improved.

In at least one embodiment of the present disclosure, the plate part may have a grip part that is provided above the mounting unit and configured to be held by a user.

According to this embodiment, the attitude of the electric kettle can be stabilized with the battery pack mounted on the second surface of the plate part and with the kettle body placed on the power supply base on the first surface side of the plate part. Accordingly, the possibility of tilting of the electric kettle can be reduced when carried by a user, so that the electric kettle is provided which is easy to carry.

In at least one embodiment of the present disclosure, the power supply unit may have a rib protruding upward from the power supply base and facing the first surface of the plate part and protruding upward from the power supply base.

According to this embodiment, the possibility that the kettle body is displaced from the power supply base can be reduced when the electric kettle is carried, so that the electric kettle is provided which is easy to carry.

In at least one embodiment of the present disclosure, the power supply base may have a through hole formed through the power supply base in the up-down direction.

According to this embodiment, even if the liquid adheres to the power supply base, the liquid can be discharged through the through hole, so that the possibility that the liquid stays on the power supply base can be reduced.

In at least one embodiment of the present disclosure, the power supply connection part may be arranged on the central portion of an upper surface of the power supply base. The upper surface may include an inclined surface inclined downward from the central portion toward an outer edge of the power supply base. The through hole may be closer to the outer edge of the power supply base than to the central portion.

According to this embodiment, even if liquid adheres to the power supply base, the liquid can flow toward the outer edge. Further, the liquid that flows toward the outer edge can be discharged through the through hole arranged close to the outer edge, so that the possibility that the liquid stays on the power supply base can be further reduced.

In at least one embodiment of the present disclosure, the plate part may have a recessed part formed in the first surface and recessed from the first surface toward the second surface of the plate part. The recessed part may be shaped to conform to a side peripheral surface of the kettle body placed on the power supply base.

According to this embodiment, the user can place the kettle body on the power supply base along the recessed part, so that the kettle body is placed in a proper position.

In at least one embodiment of the present disclosure, the electric kettle may further have a control part and a display part. The control part may be configured to calculate an amount of liquid that can be heated up to a predetermined temperature based (i) predetermined relation between amounts of the liquid in the kettle body and power that is required to heat each amount of the liquid up to the predetermined temperature and (ii) a the residual capacity of the battery pack that is obtained via the mounting unit. The display part may be provided on the power supply unit and configured to display the amount of the liquid calculated by the control part.

According to this embodiment, the user can put the displayed amount of liquid into the kettle body in order to obtain the liquid heated up to the predetermined temperature, for example, even when the residual capacity of the battery pack is small.

In at least one embodiment of the present disclosure, the power receiving connection part of the kettle body and the power supply connection part of the power supply base may be configured to be fitted together when the kettle body is placed on the power supply base and to prevent rotation of the kettle body on the power supply base.

According to this embodiment, power can be stably supplied from the power supply unit to the kettle body.

In at least one embodiment of the present disclosure, the mounting unit may be arranged in a position opposed to the kettle body placed on the power supply base across the grip part.

According to this embodiment, the attitude of the electric kettle can be stabilized with the battery pack mounted thereon and with the kettle body placed on the power supply base. Accordingly, the possibility of tilting of the electric kettle can be reduced when carried by a user, so that the electric kettle is provided which is easy to carry.

The technique of the present disclosure can also be realized in various applications other than an electric kettle and a power supply unit, such as a power supply unit having a battery pack, an electric kettle having a battery pack, and a control device used for an electric kettle.

Representative and non-limiting embodiments of the present disclosure are now specifically described with reference to the drawings.

First Embodiment

<Structure of the Electric Kettle>

An electric kettle 1 according to a first embodiment of the present disclosure is described with reference to FIGS. 1 to 16. As shown in FIGS. 1 and 2, the electric kettle 1 includes a kettle body 10 and a power supply unit 50. A user of the electric kettle 1 places the kettle body 10 containing liquid such as water, on a power supply base 70 of the power supply unit 5 having an external power source mounted thereon and turns on a power switch S1 that is provided in the power supply unit 50 in order to boil liquid in the kettle body 10. A battery pack 100 is mounted on the electric kettle 1 shown in FIGS. 1 and 4 to 8 and the power supply unit 50 shown in FIG. 11. The battery pack 100 is an example of the external power source of the electric kettle 1.

In the following description, for convenience sake, the up-down direction of the electric kettle 1 is defined with reference to the attitude of the kettle body 10 of the electric kettle 1 placed on the power supply unit 50. Specifically, the side on which the kettle body 10 is placed on the power supply unit 50 is an upper side of the electric kettle 1, while the opposite side is a lower side of the electric kettle 1. Further, an extension direction of an axis that is orthogonal to the up-down direction and that intersects the kettle body 10 and a mounting unit 90 for mounting the battery pack 100 is defined as a front-rear direction. In the front-rear direction, the side on which the mounting unit 90 is arranged on the power supply unit 50 is defined as a rear side, while the side on which the kettle body 10 is arranged is defined as a front side. A direction orthogonal to the up-down direction and the front-rear direction is defined as a left-right direction.

<Structure of the Power Supply Unit>

The power supply unit 50 is configured such that the kettle body 10 is placed thereon, and configured to supply power to the kettle body 10. In this embodiment, the power supply unit 50 mainly includes a base part 60, a wall part 80 and the mounting unit 90. The power supply unit 50 can be formed of metal or resin (polymer). The wall part 80 is a generally plate-like member extending upward from the base part 60.

As shown in FIG. 2, the base part 60 is a generally plate-like member extending in the front-rear direction and the left-right direction. A lower surface 63 of the base part 60 can be placed on a base, floor or ground.

The power supply base 70 is provided in a region of the base part 60 on a front surface 81 side of the wall part 80. The power supply base 70 is configured such that a bottom part 40 of the kettle body 10 is placed thereon. In this embodiment, an upper surface 71 of the power supply base 70 is located below an upper end of a side wall 62 of the base part 60. The area of the power supply base 70 is slightly larger than the area of the bottom part 40 of the kettle body 10. A power supply connection part 72 is provided substantially on a central portion of the upper surface 71 of the power supply base 70. As shown in the perspective view of FIG. 2, the sectional views of FIGS. 9 and 10 showing the electric kettle 1 and the top view of FIG. 11 showing the power supply unit 50, the power supply connection part 72 protrudes upward from the upper surface 71. The power supply connection part 72 is configured such that a power receiving connection part 42 (described below) of the kettle body 10 is fitted thereon. As shown in FIG. 3, in this embodiment, the power supply connection part 72 has a generally truncated conical shape having a bottom on the lower side and has a pair of notches 79 formed (recessed) from a side face 72s of the truncated conical part toward the center. A power supply connection terminal 73 that is an electrically conductive member is provided in each of the notches 79. The power supply connection terminal 73 supplies power to the kettle body 10 from the battery pack 100 mounted on the mounting unit 90.

In this embodiment, the power supply base 70 further has the following structure.

As shown in FIG. 3, the notch 79 has a pair of faces 79s connected to the side face 72s, and a face 79c connecting the faces 79s. The faces 79s are substantially parallel to each other in the up-down direction and are opposed across the power supply connection terminal 73. An upper end of each of the faces 79s is located below an upper face 72u of the power supply connection part 72. The upper end of the face 79s is connected to the upper face 72u via an inclined face 79g. The inclined face 79g is inclined toward the power supply connection terminal 73. The inclined face 79g serves as a guide to move the kettle body 10 in the circumferential direction such that a power receiving connection terminal 45 of the kettle body 10 is connected to the power supply connection terminal 73, which will be described in detail below.

The side face 72s of the power supply connection part 72 is shaped to conform to a side face 42s (see FIG. 15) of the power receiving connection part 42 (described below) of the kettle body 10. Specifically, the power supply connection part 72 is configured such that the kettle body 10 can be moved in the circumferential direction while the side face 42s of the power receiving connection part 42 can be moved along the side face 72s of the power supply connection part

72. Further, the power supply connection part 72 is configured to restrict rotation of the kettle body 10 when fitted in the power receiving connection part 42 of the kettle body 10. To restrict rotation herein means that the kettle body 10 is hardly movable in the circumferential direction when placed on the power supply base 70. Being hardly movable means that the kettle body 10 is movable only within a range in which the power receiving connection terminal 45 is held electrically connected to the power supply connection terminal 73. It can also be said that the power supply connection part 72 is configured such that the kettle body 10 cannot rotate when the power supply connection part 72 is fitted in the power receiving connection part 42 of the kettle body 10.

As shown in FIGS. 2 and 11, the power supply base 70 has through holes 77 formed through the power supply base 70 in the up-down direction. In this embodiment, the through holes 77 are closer to an outer edge of the power supply base 70, i.e. closer to the outer edge of the power supply base 70 in the radial direction, than to the power supply connection part 72. It can also be said that the through holes 77 are closer to the side wall 62 of the base part 60 and the wall part 80. In this embodiment, four such through holes 77 are provided and arranged substantially symmetrically relative to the power supply connection part 72.

As shown in FIGS. 9 and 10, the upper surface 71 of the power supply base 70 has an inclined surface 74 inclined downward from the power supply connection part 72 toward the outside (outer edge) of the power supply base 70.

As shown in FIGS. 1, 2 and 4 to 6, a rib 75 is formed in front of the power supply base 70 and protrudes upward from the power supply base 70. The rib 75 is formed in a position to face the front surface 81 of the wall part 80. The rib 75 is shaped to conform to the outer edge of the power supply base 70 and an outer peripheral surface 31 (described below) of the kettle boy 10. The rib 75 restricts forward movement of the kettle boy 10 placed on the power supply base 70. In this embodiment, an upper end of the rib 75 in the up-down direction is located above a lower end of a kettle grip part 23 (described below) of the kettle body 10 placed on the power supply base 70.

The wall part 80 is now described. In this embodiment, the wall part 80 is a generally plate-like member extending in the up-down direction and the left-right direction. The wall part 80 extends upward from the power supply base 70. The power supply base 70 is provided in a region on the front surface 81 side of the wall part 80, and the mounting unit 90 is provided in a region on a rear surface 82 side of the wall part 80. In this embodiment, the wall part 80 separates the region for the power supply base 70 and the region for the mounting unit 90.

The wall part 80 has a power supply unit grip part 85 that is arranged above the mounting unit 90 and configured to be held (gripped, grasped) by the user. The power supply unit grip part 85 is shaped with a through hole extending through the wall part 80 in the front-rear direction. It can also be said that the power supply unit grip part 85 is provided between the mounting unit 90 and the kettle body 10 placed on the power supply base 70 in the front-rear direction. An upper end of the power supply unit grip part 85 protrudes above the kettle body 10 placed on the power supply base 70. In this embodiment, the electric kettle 1 is configured such that the center of gravity of the electric kettle 1 is located on or near the wall part 80 irrespective of the amount of liquid in the kettle body 10 when the battery packs 100 are mounted on the mounting unit 90 and the kettle body 10 is placed on the power supply base 70. Thus, the power supply unit grip part 85 is arranged directly above the center of gravity of the electric kettle 1.

As shown in FIGS. 2 and 11, the wall part 80 has a recessed part 83 formed in the front surface 81 and recessed from the front surface 81 toward the rear surface 82. The recessed part 83 is shaped to conform to the outer peripheral surface 31 of the kettle body 10.

A display part 86 is provided on the rear surface 82 of the wall part 80. In this embodiment, the residual capacity of the battery pack 100 is displayed on the display part 86, which will be described in detail below.

The battery pack 100 to be mounted on the mounting unit 90 and the mounting unit 90 are now described with reference to FIGS. 12 to 14.

The battery pack 100 is an external power source to be coupled to (mounted on) the mounting unit 90. The battery pack 100 is, for example, a battery pack having a nominal voltage of 18 volt and can be used as a power source of the electric kettle 1.

The battery pack 100 may also be called as a battery package or an assembled battery, and has an outer shell housing formed into a prescribed size and a plurality of lithium ion battery cells that are housed in the outer shell housing and connected in series. The battery pack 100 is a rechargeable battery pack and can be recharged by a charger (not shown) after used as an external power source. The battery pack 100 is a so-called slide-type battery pack and can be removably coupled to (mounted on) the mounting unit 90 or a charger.

In FIG. 14, the up-down direction, the front-rear direction and the left-right direction are shown with reference to the attitude of the battery pack 100 mounted on the mounting unit 90. The battery pack 100 has a pair of left and right rail receiving parts 101. A positive output terminal 102 and a negative output terminal 103 are arranged between the rail receiving parts 101. A connector part 104 is arranged between the positive output terminal 102 and the negative output terminal 103 and configured to transmit and receive control signals to and from a charger and other devices. A lock member 105 is provided on an upper part of the battery pack 100. A spring member (not shown) is arranged below the lock member 105 within the housing of the battery pack 100. The spring member biases the lock member 105 to press the lock member 105 upward. An unlock button 106 (see, for example, FIG. 11) is arranged on a rear surface of the battery pack 100. When the unlock button 106 is pressed downward, the lock member 105 moves downward.

As shown in FIGS. 12 and 13, the mounting unit 90 is arranged on the rear surface 82 side of the wall part 80. In this embodiment, the mounting unit 90 is provided on a lower part of the rear surface 82 of the wall part 80. The mounting unit 90 has two mounting parts 91 having the same structure and electrically connected in series to each other. The mounting unit 90 is configured to connect in series two battery packs 100, for example, each having a nominal voltage of 18 volt. The electric kettle 1 can be driven with power supplied from the mounting unit 90 having the two battery packs 100 mounted thereto.

The mounting part 91 has a pair of slide rails 92. In this embodiment, the slide rails 92 extend in the up-down direction. A positive input terminal 93 and a negative input terminal 94 are arranged on the slide rails 92. The mounting part 91 further has a lock receiving hole 95 that is engageable with the lock member 105 of the battery pack 100.

The rail receiving parts 101 are engaged with the slide rails 92 and the battery pack 100 is mounted onto the mounting part 91 by sliding the battery pack 100 in a mounting direction relative to the mounting part 91. In this embodiment, the mounting direction is from up to down. When the battery pack 100 is mounted onto the mounting part 91, the positive input terminal 93 and the negative input terminal 94 of the mounting part 91 are electrically connected to the positive output terminal 102 and the negative output terminal 103 of the battery pack 100. Further, when the battery pack 100 is mounted onto the mounting part 91, the lock member 105 is engaged with the lock receiving hole 95 and the battery pack 100 is locked so as not to move in the up-down direction.

When a user presses down the unlock button 106 of the battery pack 100 mounted onto the mounting part 91, the lock member 105 is disengaged (unlocked) from the lock receiving hole 95. When the battery pack 100 is slid in a removing direction relative to the mounting part 91 in the unlocked state, the battery pack 100 is removed from the mounting part 91. In this embodiment, the removing direction is from down to up. Thus, the battery pack 100 can be removably mounted onto the mounting part 91 of the mounting unit 90.

<Structure of the Kettle Body>

As shown in FIGS. 1 to 2 and 4 to 10, the kettle body 10 has appearance mainly having a body unit 20 and a lid 21. The body unit 20 has a bottomed hollow cylindrical shape having an open top. The lid 21 is connected to the body unit 20 and configured to open and close the open top of the body unit 20. The body unit 20 has a side wall part 30, a bottom part 40 and a liquid containing part 48.

The side wall part 30 is a generally hollow cylindrical part extending in the up-down direction of the body unit 20. The side wall part 30 forms the outer peripheral surface 31 of the kettle body 10. A spout 22 for pouring liquid from the liquid containing part 48 is formed in an upper end part of the side wall part 30. The kettle grip part 23 for holding the kettle body 10 is provided in a position opposed to the spout 22 when the kettle body 10 is viewed from above. Ends of the kettle grip part 23 are connected to upper and lower end parts of the side wall part 30. The side wall part 30 and the kettle grip part 23 can be formed of metal or resin.

The bottom part 40 is a part connected to the lower end of the side wall part 30. The bottom part 40 can be formed of metal or resin. The power receiving connection part 42 is provided on the center of a lower surface 41 of the bottom part 40. As shown in the sectional views of FIGS. 9 and 10 showing the electric kettle 1 and the bottom view of FIG. 15 showing the kettle body 10, the power receiving connection part 42 protrudes upward from the lower surface 41. The power receiving connection part 42 is configured to be fitted on the power supply connection part 72 of the power supply unit 50. In this embodiment, the power receiving connection part 42 has a generally truncated conical shape having a bottom on the lower side and has a pair of plate-like members 44 protruding from a side face of the truncated conical part toward the center. The power receiving connection terminal 45 that is an electrically conductive member is provided on each of the plate-like members 44. The power receiving connection terminal 45 receives power from an external power source via the power supply connection part 72. In this embodiment, the power receiving connection part 42 is configured to restrict movement of the kettle body 10 in cooperation with the power supply connection part 72 of the power supply unit 50 when fitted on the power supply connection part 72.

In this embodiment, each of the plate-like members 44 has a gap extending substantially in the up-down direction and configured such that the power supply connection terminal 73 can be inserted therein. The power receiving connection terminal 45 is provided on a pair of faces 44s of the plate-like member 44 that define the gap. When the kettle body 10 is positioned relative to the power supply connection part 72 in the circumferential direction such that the plate-like members 44 are fitted in the notches 79 (see FIG. 3), the power receiving connection terminals 45 are connected to the power supply connection terminals 73, respectively, and movement of the kettle body 10 is restricted.

In this embodiment, as described above, each of the notches 79 of the power supply connection part 72 has the inclined face 79g inclined downward from the upper face 72u of the power supply connection part 72 toward the power supply connection terminal 73. When the plate-like member 44 of the kettle body 10 is located on the inclined face 79g, the kettle body 10 moves downward along the inclined face 79g under its own weight and the plate-like member 44 is fitted in the notch 79. Thus, in the electric kettle 1 according to this embodiment, positioning of the kettle body 10 relative to the power supply unit 50 is completed when the plate-like member 44 is placed on the notch 79 or the inclined face 79g in the circumferential direction. Even if the plate-like member 44 is not placed on the inclined face 79g, a user can move the kettle body 10 in the circumferential direction to place the plate-like member 44 on the inclined face 79g. Thus, the kettle body 10 moves downward along the inclined face 79g under its own weight, so that the positioning of the kettle body 10 is completed.

Further, in this embodiment, the lower surface 41 of the bottom part 40 of the kettle body 10 has an inclined face 46 inclined downward and radially outward from the power receiving connection part 42. The inclined face 46 is shaped to conform to the inclined surface 74 of the power supply base 70. Thus, the kettle body 10 is stably placed on the power supply base 70.

The liquid containing part 48 is provided inside of the side wall part 30 and the bottom part 40. The liquid containing part 48 is shaped such that liquid such as water can be stored inside. An inner surface of the liquid containing part 48 may be coated with heat-resistant resin such as fluororesin. A bottom of the liquid containing part 48 is formed of heat conductive materials such as metal. As shown in FIG. 9, a temperature sensor Tc for measuring the temperature of liquid in the liquid containing part 48 is provided on a bottom of the liquid containing part 48.

As shown in FIG. 10, a heater 49 is installed in the bottom part 40. The heater 49 receives power via the power receiving connection part 42 and heats liquid in the liquid containing part 48 above the bottom part 40. The structure of the kettle body 10 described in this embodiment is just an example. The kettle body 10 may have a known structure except a structure in which power is received from the power supply unit 50 having the mounting unit 90.

<System Configuration>

One example of the system configuration of the electric kettle 1 is now described. As shown in FIG. 16, in this embodiment, the power supply unit 50 has a control device 65. The control device 65 is configured as a microcomputer, having a CPU, a memory and an interface. The control device 65 serves as a control part 66 by developing and executing a program stored in the memory. The control part 66 obtains, for example, a measured value of the temperature sensor Tc provided on the bottom of the liquid containing part 48, and a predetermined set temperature. The control part 66 controls to heat the liquid in the liquid containing part 48 up to the set temperature by using the obtained measured value and set temperature. The predetermined set temperature may be set by a user, for example, by using a temperature setting part 67 provided in the power supply unit 50. The temperature setting part 67 is an input interface by which a user can set a temperature. Further, the predetermined set temperature may be stored in the memory of the control device 65 in advance. For example, the boiling temperature of the liquid may be stored as the set temperature in the memory.

In this embodiment, the control part 66 is capable of obtaining the residual capacity of the battery pack 100 and displaying it on the display part 86 (see FIG. 13).

Effects

According to the above-described first embodiment, the electric kettle 1 has the following effects.

(A1) The power supply unit 50 has the mounting unit 90 configured such that the battery pack 100 can be removably coupled thereto, which facilitates handling of the kettle body 10, compared with a structure in which the battery pack 100 is coupled to the kettle body 10.

(A2) The power supply base 70 on which the kettle body 10 is placed is arranged on one surface (the front surface 81) side of the wall part 80, and the mounting unit 90 is arranged on the second surface (the rear surface 82) side of the wall part 80. Thus, the possibility that liquid to be used for the electric kettle 1 adheres to the mounting unit 90 can be reduced, so that the safety and durability of the electric kettle 1 is improved. Furthermore, when a user opens the lid 21 of the kettle body 10 and puts liquid into the kettle body 10 while leaving the kettle body 10 placed on the power supply base 70, the possibility that the liquid also adheres from adhering to the mounting unit 90 or the battery pack 100 can be reduced. Thus, the safety and durability of the electric kettle 1 is improved, and the degree of freedom in handling of the electric kettle 1 is improved.

(A3) In the electric kettle 1 according to this embodiment, with the structure in which the power supply base 70 is arranged on the front surface 81 side of the wall part 80, while the mounting unit 90 is arranged on the rear surface 82 side of the wall part 80, the possibility that the liquid in the kettle body 10 adheres to the mounting unit 90 can be reduced.

(A4) The mounting unit 90 has the slide rails 92 extending in the up-down direction and that is configured such that the battery pack 100 is removably coupled thereto by sliding on the slide rails 92 in the up-down direction. Thus, even if the liquid in the kettle body 10 adheres to the slide rails 92, the liquid can easily drop downward, so that the safety and durability of the electric kettle 1 is further improved.

(A5) The wall part 80 has the power supply unit grip part 85 configured to be held by a user. Thus, the user can hold the power supply unit grip part 85 and carry the power supply unit 50 alone or carry the electric kettle 1 with the kettle body 10 on the power supply unit 50. Further, the power supply unit grip part 85 is arranged above the mounting unit 90 on the wall part 80. Thus, the attitude of the electric kettle 1 can be stabilized with the battery pack 100 mounted on the rear surface 82 of the wall part 80 and with the kettle body 10 placed on the power supply base 70 on the front surface 81 side of the wall part 80. Accordingly, the possibility of tilting of the electric kettle 1 can be reduced when carried by a user, so that the electric kettle 1 is provided which is easier to carry.

In relation to the above-described effect (A5), in this embodiment, the electric kettle 1 is configured such that the center of gravity of the electric kettle 1 is located on or near the wall part 80 irrespective of the amount of liquid in the kettle body 10 when the battery pack 100 is mounted on the mounting unit 90 and the kettle body 10 is placed on the power supply unit 50. Thus, the power supply unit grip part 85 is arranged directly above the center of gravity of the electric kettle 1 in use, so that the electric kettle 1 is provided which is further easier to carry.

(A6) The power supply unit 50 has the rib 75 protruding upward from the power supply base 70 and facing the front surface 81 of the wall part 80. Thus, the possibility that the electric kettle 1 is displaced from the power supply base 70 can be reduced when the electric kettle 1 is carried, so that the electric kettle 1 is provided which is easier to carry.

(A7) The power supply base 70 has the through holes 77 formed through the power supply base 70 in the up-down direction. Thus, even if the liquid adheres to the power supply base 70, the liquid can be discharged through the through holes 77. Accordingly, the possibility that the liquid stays on the power supply base 70 can be reduced, so that the safety and durability of the electric kettle 1 is further improved.

(A8) The power supply base 70 includes the inclined surface 74 inclined downward from the central portion of the upper surface 71 toward the outer edge of the power supply base 70. Thus, even if liquid adheres to the power supply base 70, the liquid is discharged toward the outside. Further, the through holes 77 are arranged closer to the outer edge of the power supply base 70 than to the central portion of the power supply base 70. Thus, the liquid that can flow toward the outer edge is discharged through the through holes 77 arranged close to the outer edge. Accordingly, the possibility that the liquid stays on the power supply base 70 can be further reduced, so that the safety and durability of the electric kettle 1 is furthermore improved.

(A9) The wall part 80 of the power supply unit 50 has the recessed part 83 formed in the front surface 81 and recessed from the front surface 81 toward the rear surface 82 of the wall part 80. The recessed part 83 is shaped to conform to the outer peripheral surface 31 of the side wall part 30 of the kettle body 10. Thus, the user can place the kettle body 10 on the power supply base 70 along the recessed part 83, so that the kettle body 10 is placed in a proper position.

(A10) The power receiving connection part 42 of the kettle body 10 and the power supply connection part 72 of the power supply base 70 are configured to be fitted together when the kettle body 10 is placed on the power supply base 70. The power receiving connection part 42 and the power supply connection part 72 are configured to restrict rotation of the kettle body 10 on the power supply base 70 when fitted together. Thus, power can be stably supplied from the power supply unit 50 to the kettle body 10.

(A11) The upper end of the rib 75 in the up-down direction is located above the lower end of the kettle grip part 23 of the kettle body 10 placed on the power supply base 70. Thus, the user can place the kettle body 10 on the power supply unit 50 such that the kettle grip part 23 is located between the rib 75 and the wall part 80 in the front-rear direction. Further, in this embodiment, the power receiving connection part 42 and the power supply connection part 72 are configured to be fitted together within a range in which the kettle grip part 23 is located between the rib 75 and the wall part 80 in the front-rear direction. Thus, the rib 75 has a positioning function for properly placing the kettle body 10 on the power supply base 70 in cooperation with the wall part 80. Accordingly, the user can easily place the kettle body 10 in a proper position.

Second Embodiment

<Structure of the Power Supply Unit>

An electric kettle 1a according to a second embodiment of the present disclosure is described with reference to FIG. 17. In the following description, components identical to those of the above-described embodiment are given the same numerals and not described. In the electric kettle 1a of the second embodiment, a control device 65a of a power supply unit 50a serves as a control part 66a by executing a program stored in a memory. The control device 65a stores a predetermined relation between amounts of liquid in the kettle body 10 and power required to heat each amount of the liquid up to a predetermined temperature. The control part 66a calculates an actual amount of the liquid that can be heated up to the predetermined temperature based on the above-described relation and the residual capacity of the battery pack 100 that is obtained via the mounting unit 90.

A display part 86a displays the liquid amount calculated by the control part 66a. An example of the display of the display part 86a is shown in FIG. 17. The amount of liquid that can be contained in the liquid containing part 48 is shown by a scale, and the liquid amount calculated by the control part 66a is shown cross-hatched. The electric kettle 1a according to this embodiment is otherwise similar to the electric kettle 1 according to the first embodiment and will not be further elaborated here.

Effects

According to this embodiment, the electric kettle 1a has the control part 66a that is configured to calculate the amount of liquid that can be heated up to the predetermined temperature. For this calculation, the control part 66a uses the relation between the amounts of the liquid in the kettle body 10 and the power required to heat each amount of the liquid up to the predetermined temperature, and the residual capacity of the battery pack 100. Further, the power supply unit 50a has the display part 86a that displays the calculated liquid amount. Thus, the user can put the displayed amount of liquid into the kettle body 10 in order to obtain the liquid heated up to the predetermined temperature, for example, even when the residual capacity of the battery pack 100 is small.

The electric kettle 1a according to this embodiment has the same structure as the electric kettle 1 according to the first embodiment except for the control part 66a and the display part 86a. Therefore, the electric kettle 1a according to this embodiment also has the same effects as the effects (A1) to (A11) of the first embodiment.

Third Embodiment

<Structure of the Power Supply Unit>

An electric kettle 1b according to a third embodiment of the present disclosure is described with reference to FIG. 18. The electric kettle 1b is different from the electric kettle 1 according to the first embodiment in that a mounting unit 90b of a power supply unit 50b does not have the slide rails 92. In this embodiment, the mounting unit 90b is configured such that a battery pack 100b is coupled thereto via an electric cord 120b.

Specifically, in this embodiment, the battery pack 100b has a battery body 110b and the electric cord 120b having one end connected to the battery body 110b. The battery body 110b includes a plurality of lithium ion battery cells connected in series. A connection end part 125b is provided on the other end of the electric cord 120b and has an insertion port for connection to the mounting unit 90b. The mounting unit 90b has a mounting part (not shown) configured such that the insertion port of the connection end part 125b is plugged therein. The electric kettle 1b according to this embodiment is otherwise similar to the electric kettle 1 according to the first embodiment and will not be further elaborated here.

Effects

According to this embodiment, the electric kettle 1b has the same effects as the effects (A1) to (A3) and (A5) to (A11) of the first embodiment, excluding the effect (A4) relating to the slide rails 92 of the mounting unit 90 in the first embodiment.

Fourth Embodiment

<Structure of the Power Supply Unit>

An electric kettle 1c according to a fourth embodiment of the present disclosure is described with reference to FIG. 19. In FIG. 19, main parts of the electric kettle 1c that are not visible from the outside are shown by broken lines. A power supply unit 50c of the electric kettle 1c mainly includes a base part 60c and a mounting unit 90c. Unlike the electric kettle 1 according to the first embodiment, the power supply unit 50c does not have the wall part 80 and the power supply unit grip part 85.

The base part 60c separates a region for a power supply base 70c and a region for the mounting unit 90c. The power supply base 70c is provided on an upper surface 61c side of the base part 60c. The power supply base 70c is a portion of the upper surface 61c of the base part 60c that is recessed downward.

The mounting unit 90c is provided on a lower surface 63c side of the base part 60c. Two mounting parts 91c are arranged in the mounting unit 90c. Each of the mounting parts 91c has a pair of slide rails (not shown). In this embodiment, the slide rails extend in the front-rear direction. The battery pack 100 can be coupled to and removed from the mounting part 91c by sliding the battery pack 100 in the front-rear direction relative to the slide rails. In the electric kettle 1c, a surface of the battery pack 100 (a lower surface of the battery pack 100 in FIG. 19) opposite to a surface thereof having the rail receiving parts 101 (see FIG. 14) can be placed on a base, floor or ground. The electric kettle 1c according to this embodiment is otherwise similar to the electric kettle 1 according to the first embodiment and will not be further elaborated here.

Effects

In the electric kettle 1c according to the fourth embodiment, the power supply unit 50c has the mounting unit 90c configured such that the battery pack 100 is removably coupled thereto, which facilitates handling of the kettle body 10, compared with a structure in which the battery pack 100 is mounted on the kettle body 10. Therefore, the electric kettle 1c has the same effect as the above-described effect (A1) of the first embodiment.

The power supply base 70c on which the kettle body 10 is placed is arranged on one surface (the upper surface 61c) side of the base part 60c, and the mounting unit 90c configured such that the battery pack 100 is mounted thereon is arranged on the second surface (the lower surface 63c) side of the base part 60c. Thus, the possibility that liquid to be used for the electric kettle 1*c* adheres to the mounting unit 90*c* can be reduced. Therefore, the electric kettle 1*c* has the same effect as the effect (A2) of the first embodiment.

Fifth Embodiment

<Structure of the Power Supply Unit>

An electric kettle 1*d* according to a fifth embodiment of the present disclosure is described with reference to FIG. 20. In FIG. 20, main parts of the electric kettle 1*d* that are not visible from the outside are shown by broken lines. A power supply unit 50*d* of the electric kettle 1*d* mainly includes a base part 60*d*, a mounting unit 90*d* and a power supply unit grip part 85*d*. Unlike the first embodiment, the power supply unit 50*d* does not have the wall part 80.

A power supply base 70*d* is provided on an upper surface 61*d* side of the base part 60*d*. The power supply base 70*d* is a portion of the upper surface 61*d* of the base part 60*d* that is recessed downward. The mounting unit 90*d* is provided on a side surface 62*d* of the base part 60*d*. Thus, the electric kettle 1*d* according to this embodiment is different from the above-described embodiments in that the power supply base 70*d* is arranged on one surface (the upper surface 61*d*) side of the base part 60*d* and the mounting unit 90*d* is provided on the side surface 62*d* of the base part 60*d*. The second surface (a lower surface 63*d*) of the base part 60*d* can be placed on a base, floor or ground.

The mounting unit 90*d* has two mounting parts 91*d*. The mounting parts 91*d* are arranged side by side in the front-rear direction, and only one of the mounting parts 91*d* is shown in FIG. 20. Each of the mounting parts 91*d* has a pair of slide rails (not shown). The battery pack 100 can be coupled to (mounted onto) the mounting part 91*d* by sliding the battery pack 100 in the mounting direction relative to the slide rails.

A power supply unit grip part 85*d* extends upward from the power supply base 70*d*. An upper end of the power supply unit grip part 85*d* protrudes above the kettle body 10 placed on the power supply base 70*d*.

Effects

According to this embodiment, the power supply unit 50*d* has the mounting unit 90*d* configured such that the battery pack 100 is mounted thereon, which facilitates handling of the kettle body 10, compared with a structure in which the battery pack 100 is mounted on the kettle body 10. Therefore, this embodiment also has the same effect as the effect (A1) of the first embodiment.

Further, the power supply unit 50*d* has the power supply unit grip part 85*d*, so that the user can hold the power supply unit grip part 85*d* and carry the power supply unit 50*d* or carry the kettle body 10 and the power supply unit 50*d* together.

OTHER EMBODIMENTS

In the electric kettle 1 according to the above-described first embodiment, structures other than the structures that provide the effects (A1) and (A2) may be appropriately changed. Specifically, in the electric kettle 1, insofar as the power supply unit 50 has the mounting unit 90 and the power supply base 70 is arranged on the first surface side of the wall part 80 while the mounting unit 90 is arranged on the second surface side of the wall part 80, the other structures may be appropriately changed.

For example, the power supply base 70 need not have the inclined surface 74. The power supply connection part 72 and the power receiving connection part 42 may have other shapes insofar as these parts are configured to be electrically connected to each other when the kettle body 10 is placed on the power supply base 70.

In the above-described embodiments, the kettle body 10 may be, for example, a kettle that is configured to be placed on a commercial power supply unit connected to an AC power source.

The through holes 77, if provided in the power supply base 70, 70*b*, 70*d*, may be closer to the power supply connection part 72 than to the outer edge of the power supply base 70, 70*b*, 70*d*. This structure can also reduce the possibility that liquid to be used for the kettle body 10 stays on the power supply base 70, 70*b*, 70*d*.

The control device 65, 65*a* may be provided in the kettle body 10. In this case, the kettle body 10 may be configured to obtain the residual capacity of the battery pack 100 and the set temperature via the power supply connection part 72 and the power receiving connection part 42 that are provided in the kettle body 10. Like the control device 65, 65*a*, the display part 86, 86*a* may also be provided in the kettle body 10.

The power supply unit 50 may be configured to include the mounting unit 90*b* of the third embodiment. Specifically, the mounting unit 90 of the power supply unit 50 may be configured such that the battery pack 100 and the battery pack 100*b* are selectively removably mounted thereto.

The electric kettle 1, 1*a*, 1*b*, 1*c*, 1*d* may have a charging function. For example, the electric kettle 1, 1*a*, 1*b*, 1*c*, 1*d* may have a connection part configured to be connected to an AC power source and be configured to charge the battery pack 100, 100*b* when the AC power source is connected to the connection part. The base part 60, 60*c*, 60*d* may have a charging circuit for this charging, or a unit having a charging circuit may be provided in the middle of a cord for the AC power source.

Various connecting structures that are applicable to the kettle body 10 are now described with reference to FIGS. 21 to 28. FIGS. 21 to 25 and 28 are enlarged views each showing a part that substantially corresponds to a part P surrounded by a broken line in FIG. 9 used in the first embodiment.

<First Connecting Structure>

A lid 21*e* of a kettle body 10*e* shown in FIGS. 21 and 22 has a lid body 24 for closing an opening of the body unit 20 (see, for example, FIG. 9), and a protruding part 25*e* protruding from a side surface of the lid body 24. The protruding part 25*e* is configured such that the lid 21*e* is connected to a kettle grip part 23*e*. The protruding part 25*e* has a connection part 251*e* connected to the lid body 24, and a pair of locking pieces 252*e* protruding from the connection part 251*e*. Each of the locking pieces 252*e* has an inclined face 253*e* inclined toward a protruding end part of the protruding part 25*e* from the connection part 251*e*, and a generally cylindrical projection 254*e* formed on the protruding end part. The cylindrical projections 254*e* protrude from the respective locking pieces 252*e* so as to face each other and serve as a pivot of the lid 21*e* when the lid 21*e* is opened and closed.

A receiving part 231*e* for locking the locking pieces 252*e* is formed in an upper end part of the kettle grip part 23*e*. The receiving part 231*e* is a portion of the kettle grip part 23, which is open toward the lid body 24 (more precisely, the spout 22; see, for example, FIG. 9). As shown in FIG. 21, the receiving part 231*e* is mainly defined by an upper face 232*e* and a lower face 233e. A portion 235e of the upper face 232e is continuous to a portion (a main grip part 26) of the kettle grip part 23e that extends in the up-down direction of the kettle grip part 23e and has a generally circular arc shape in sectional view so as to conform to the cylindrical projection 254e. The upper face 232e further has an inclined face 236e inclined upward from the circular arc portion 235e. The inclined face 236e is inclined to extend along the inclined face 253e of the locking piece 252e. A portion 237e of the lower face 233e that faces the portion 235e of the upper face 232e also has a generally circular arc shape in sectional view. The lower face 233e further has an inclined face 238e inclined downward from an upper end of the portion 237e. A protrusion 239e protruding upward is defined on the lower face 233e by the circular arc portion 237e and the inclined face 238e. The protrusion 239e is formed of synthetic resin and elastically deformable.

In the kettle body 10e, the lid 21e is connected to the kettle grip part 23e when the cylindrical projection 254e of the locking piece 252e is fitted in the portions 235e, 237e of the receiving part 231e. When a user pulls the lid 21e upward toward the spout 22 in this connected state, the cylindrical projection 254e first abuts on the protrusion 239e. The protrusion 239e elastically deforms and the cylindrical projection 254e moves from the portions 235e, 237e to the inclined faces 236e, 238e over the protrusion 239e. The user can remove the lid 21e from the kettle grip part 23e by moving the inclined face 253e of the locking piece 252e upward along the inclined face 236e of the receiving part 231e. Thus, for example, the user can remove the lid 21e from the kettle grip part 23e to wash the lid 21e.

<Second Connecting Structure>

A second connecting structure is described with reference to FIGS. 23 to 25. In a kettle body 10f, the lid body 24 is connected to a kettle grip part 23f via a connecting member 25f. A housing part 231f is provided in an upper end part of the kettle grip part 23f. The housing part 231f is defined by an upper face 232f, a lower face 233f and a pair of side faces 234f and configured to house part of the connecting member 25f. In sectional views of FIGS. 23 to 25, only one of the side faces 234f is shown. The housing part 231f is open toward the spout 22. A rod-like member 235f is connected to the side faces 234f. The lower face 233f has a generally circular arc shape centering around the rod-like member 235f in sectional view. The rod-like member 235f serves as a pivot of the lid 21f when the lid 21f is opened and closed.

The connecting member 25f has a first end part 251f that is connected to the lid body 24, and a second end part 252f that is opposite to the first end part 251f and is engaged with the rod-like member 235f. The second end part 252f has a recess for engagement between the connecting member 25f and the rod-like member 235f. As shown in FIG. 23, the recess is recessed downward when the lid 21f is closed. The connecting member 25f further has a portion 253f, a portion 254f and a portion 255f. The portion 253f is continuous to the second end part 252f and extends substantially in a radial direction of the recess. The portion 254f is continuous to the portion 253f and has a generally circular arc shape so as to conform to the lower face 233f. The portion 255f connects the portion 254f and the first end part 251f and protrudes from the housing part 231f through an opening. Protrusions 257f protruding radially outward are formed on apart of the portion 254f contiguous to the portion 253f. Two protrusions 257f are provided as shown in sectional view. The protrusions 257f are configured to be drawn out of the housing part 231f when a user opens the lid 21f with prescribed force. The protrusions 257f serve as a resistance member when the connecting member 25f is drawn out of the housing part 231f through the opening.

When the user opens the lid 21f, the connecting member 25f turns around the rod-like member 235f and the protrusions 257f move upward along the lower face 233f in abutment with the lower face 233f. When the user further opens the lid 21f with prescribed force, the portion 254f and the protrusions 257f move out of the housing part 231f, and as shown in FIG. 25, the recess of the connecting member 25f is disengaged (disconnected) from the rod-like member 235f. Thus, the user can draw the portion 253f of the connecting member 25f out of the housing part 231f. In this manner, the user can remove the lid 21f from the kettle grip part 23f.

<Third Connecting Structure>

A third connecting structure is described with reference to FIGS. 26 to 28. Unlike the kettle body 10f, a kettle body 10g is configured such that a lid body 24g and a connecting member 25g are removable from each other. As shown in FIG. 26, a first end part 251g (a portion 255g continuous to the first end part 251g) of the connecting member 25g is fitted in a pair of locking parts 241g of the lid body 24g. The portion 255g is configured to be elastically deformable, and in this embodiment, a flat spring is used as the portion 255g. When the user opens a lid 21g and moves it upward, protrusions 257f of the connecting member 25g move upward along the lower face 233f in abutment with the lower face 233f. As described above, the protrusions 257f are configured to be drawn out of the housing part 231f when a user moves the lid 21f upward with prescribed force. Further, the portion 255g of the connecting member 25g is configured to be disengaged from the locking parts 241g of the lid body 24g with prescribed force that is applied by a user to move the protrusions 257f out of the housing part 231f. With such a structure, in the third connecting structure, force larger than the prescribed force is not applied to the rod-like member 235f. Thus, provision of the third connecting structure can reduce the force applied to the rod-like member 235f compared with the second connecting structure. Further, like the connecting member 25f of the second connecting structure, the connecting member 25g can be drawn out of the housing part 231f through the opening.

Correspondences between the features of the above-described embodiments and the features of the present disclosure are as follows.

The electric kettles 1, 1a, 1b, 1c, 1d are examples of the "electric kettle". The kettle bodies 10, 10e, 10f, 10g are examples of the "kettle body". The wall part 80 and the base part 60c are examples of the "plate part". The front surface 81 of the wall part 80 and the upper surface 61c of the base part 60c are examples of the "first surface of the plate part". The rear surface 82 of the wall part 80 and the lower surface 63c of the base part 60c are examples of the "second surface of the plate part". The power supply bases 70, 70c, 70d are examples of the "power supply base". The power supply unit grip parts 85, 85d are examples of the "grip part". The recessed part 83 is an example of the "recessed part". The power supply connection part 72 and the power receiving connection part 42 are examples of the "power supply connection part" and the "power receiving connection part", respectively. The heater 49 is an example of the "heating part". The battery packs 100, 100b are examples of the "battery pack". The mounting units 90, 90b, 90c, 90d are examples of the "mounting unit". The slide rail 92 is an example of the "rail". The rib 75 is an example of the "rib". The through hole 77 is an example of the "through hole".

The inclined surface 74 is an example of the "inclined surface". The outer peripheral surface 31 of the side wall part 30 is an example of the "side peripheral surface of the kettle body". The control part 66a is an example of the "control part". The display part 86a is an example of the "display part".

The present disclosure is not limited to the above-described embodiments, but can be implemented in various structures without departing from the scope of the disclosure. For example, the technical features in the embodiments that correspond to the technical features in the aspects described in "Summary" herein can be appropriately replaced or combined in order to solve at least one of the above-described problems or to achieve at least one of the above-described effects. Further, at least one of the technical features can be appropriately omitted unless described as being essential in this specification. For example, the present disclosure can also be implemented as a power supply unit on which the kettle body can be placed.

DESCRIPTION OF THE REFERENCE NUMERALS

1, 1a, 1b, 1c, 1d . . . electric kettle, 10, 10e, 10f, 10g . . . kettle body, 20: body unit, 21, 21e, 21f, 21g . . . lid, 22: spout, 23, 23e, 23f . . . kettle grip part, 25e . . . protruding part, 25f, 25g . . . connecting member, 26: main grip part, 30 . . . side wall part, 31 . . . outer peripheral surface, 40 . . . bottom part, 41 . . . lower surface, 42 . . . power receiving connection part, 42s . . . side face, 44 . . . plate-like member, 44s . . . face, 45 . . . power receiving connection terminal, 46 . . . inclined face, 48 . . . liquid containing part, 49 . . . heater, 50, 50a, 50b, 50c, 50d . . . power supply unit, 60, 60c, 60d . . . base part, 61c, 61d . . . upper surface, 62, 62d . . . side surface, 63, 63c, 63d . . . lower surface, 65, 65a . . . control device, 66, 66a . . . control part, 67 . . . temperature setting part, 70, 70c, 70d . . . power supply base, 71 . . . upper surface, 72 . . . power supply connection part, 72s . . . side face, 72u . . . upper face, 73 . . . power supply connection terminal, 74 . . . inclined surface, 75 . . . rib, 77 . . . through hole, 79 . . . notch, 79c . . . face, 79g . . . inclined face, 79s . . . face, 80 . . . wall part, 81 . . . front surface, 82 . . . rear surface, 83 . . . recessed part, 85, 85d . . . power supply unit grip part, 86 . . . display part, 90, 90b, 90c, 90d . . . mounting unit, 91, 91c, 91d . . . mounting part, 92 . . . slide rail, 93 . . . positive input terminal, 94 . . . negative input terminal, 95 . . . lock receiving hole, 100, 100b . . . battery pack, 101 . . . rail receiving part, 102 . . . positive output terminal, 103 . . . negative output terminal, 104 . . . connector part, 105 . . . lock member, 106 . . . unlock button, 110b . . . battery body, 120b . . . electric cord, 125b . . . connection end part, 231e . . . receiving part, 231f . . . housing part, 232e, 232f . . . upper face, 233e, 233f . . . lower face, 234f . . . side face, 235e . . . portion, 235f . . . rod-like member, 236e, 238e . . . inclined face, 237e . . . portion, 239e . . . protrusion, 241g . . . locking part, 251e . . . connection part, 251f, 251g . . . first end part, 252e . . . locking piece, 252f . . . second end part, 253e . . . inclined face, 253f . . . portion, 254e . . . cylindrical projection, 254f . . . portion, 255f . . . portion, 255g . . . portion, 257f . . . protrusion, S1 . . . power switch, Tc . . . temperature sensor

The invention claimed is:

1. An electric kettle, comprising:
a kettle body having a power receiving connection terminal configured to receive power from an external power source, and a heating part configured to heat liquid contained in the kettle body by the power the power receiving connection terminal receives; and
a power supply unit configured such that the kettle body is placed thereon, and configured to supply power to the kettle body,
the power supply unit including:
a plate part that includes a wall and a base, the wall extending orthogonally from the base such that the plate part defines a first surface of the wall and the base and a second surface of the wall and the base opposing the first surface of the wall and the base;
a power supply base that is arranged on a side of the first surface of the plate part and configured such that the kettle body is placed on top thereof, the power supply base having a power supply connection terminal that is configured to be electrically removably connected to the power receiving connection terminal; and
a mounting unit that is arranged on a side of the second surface of the plate part and configured such that a battery pack is removably coupled thereto as the external power source for supplying power to the heating part via the power supply connection terminal and the power receiving connection terminal, wherein:
the plate part is connected to the power supply base,
the wall is offset from a rear edge of the base such that the wall divides the base into a first region that accommodates the kettle body and a second region that accommodates the power supply unit, and
the mounting unit is arranged on the second surface of the wall and the base.

2. The electric kettle as defined in claim 1, wherein the mounting unit has a rail that extends in an up-down direction and that is configured such that the battery pack is removably coupled thereto by sliding in the up-down direction.

3. The electric kettle as defined in claim 2, wherein, the plate part has a grip part that is provided above the mounting unit and configured to be held by a user.

4. The electric kettle as defined in claim 3, wherein, the power supply unit further has a rib formed in a position to face the first surface of the plate part and protruding upward from the power supply base.

5. The electric kettle as defined in claim 4, wherein the power supply base has a through hole formed through the power supply base in the up-down direction.

6. The electric kettle as defined in claim 5, wherein, the power supply connection terminal is arranged on a center of an upper surface of the power supply base,
the upper surface has an inclined surface inclined downward from the center toward an outer edge of the power supply base, and
the through hole is arranged closer to the outer edge of the power supply base than to the center.

7. The electric kettle as defined in claim 1, wherein the plate part has a grip part that is provided above the mounting unit and configured to be held by a user.

8. The electric kettle as defined in claim 1, wherein the power supply unit has a rib protruding upward from the power supply base and facing the first surface of the plate part.

9. The electric kettle as defined in claim 1, wherein the power supply base has a through hole formed through the power supply base in an up-down direction.

10. The electric kettle as defined in claim 9, wherein:
the power supply connection terminal is on a central portion of an upper surface of the power supply base, the upper surface includes an inclined surface inclined downward from the central portion toward an outer edge of the power supply base, and the through hole is closer to the outer edge of the power supply base than to the central portion.

11. The electric kettle as defined in claim 1, wherein the plate part has a recessed part formed in the first surface and recessed from the first surface toward the second surface of the plate part, the recessed part being shaped to conform to a side peripheral surface of the kettle body placed on the power supply base.

12. The electric kettle as defined in claim 1, further comprising:
   a controller that is configured to calculate an amount of liquid that can be heated up to a predetermined temperature based on (i) a predetermined relation between amounts of the liquid in the kettle body and power required to heat each amount of the liquid up to the predetermined temperature and (ii) a residual capacity of the battery pack that is obtained via the mounting unit, and
   a visual display that is provided on the power supply unit and configured to display the amount of the liquid calculated by the controller.

13. The electric kettle as defined in claim 1, wherein:
   the power receiving connection terminal of the kettle body and the power supply connection terminal of the power supply base are configured to be fitted together when the kettle body is placed on the power supply base and to restrict rotation of the kettle body on the power supply base.

14. A power supply unit that is configured such that a kettle body is placed thereon, the kettle body having a power receiving connection terminal configured to receive power from an external power source, and a heating part configured to heat liquid contained in the kettle body by the power the power receiving connection terminal receives, the power supply unit comprising:
   a plate part that includes a wall and a base, the wall extending orthogonally from the base such that the plate part defines a first surface of the wall and the base and a second
surface of the wall and the base opposing the first surface of the wall and the base;
   a power supply base that is arranged on a side of the first surface of the plate part and configured such that the kettle body is placed on top thereof, the power supply base having a power supply connection terminal that is configured to be electrically removably connected to the power receiving connection terminal; and
   a mounting unit that is arranged on a side of the second surface of the plate part and configured such that a battery pack is removably coupled thereto as the external power source for supplying power to the heating part via the power supply connection terminal and the power receiving connection terminal, wherein:
   the plate part is connected to the power supply base,
   the wall is offset from a rear edge of the base such that the wall divides the base into a first region that accommodates the kettle body and a second region that accommodates the power supply unit, and
   the mounting unit is arranged on the second surface of the wall and the base.

15. An electric kettle, comprising:
a kettle body having a power receiving connection terminal configured to receive power from an external power source, and a heating part configured to heat liquid contained in the kettle body by the power the power receiving connection terminal receives; and
a power supply unit configured such that the kettle body is placed thereon, and configured to supply power to the kettle body,
the power supply unit including:
   a plate part having a first surface and a second surface;
   a power supply base that is arranged on a side of the first surface of the plate part and configured such that the kettle body is placed on top thereof, the power supply base having a power supply connection terminal that is configured to be electrically removably connected to the power receiving connection terminal;
   a mounting unit that is arranged on a side of the second surface of the plate part and configured such that a battery pack is removably coupled thereto as the external power source for supplying power to the heating part via the power supply connection terminal and the power receiving connection part;
   a controller that is configured to calculate an amount of liquid that can be heated up to a predetermined temperature based on (i) a predetermined relation between amounts of the liquid in the kettle body and power required to heat each amount of the liquid up to the predetermined temperature and (ii) a residual capacity of the battery pack that is obtained via the mounting unit; and
a visual display that is provided on the power supply unit and configured to display the amount of the liquid calculated by the controller.

* * * * *